(12) United States Patent
Chen et al.

(10) Patent No.: US 8,458,267 B2
(45) Date of Patent: Jun. 4, 2013

(54) DISTRIBUTED PARALLEL MESSAGING FOR MULTIPROCESSOR SYSTEMS

(75) Inventors: Dong Chen, Yorktown Heights, NY (US); Philip Heidelberger, Yorktown Heights, NY (US); Valentina Salapura, Yorktown Heights, NY (US); Robert M. Senger, Yorktown Heights, NY (US); Burkhard Steinmacher-Burow, Boeblingen (DE); Yutaka Sugawara, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/693,972

(22) Filed: Jan. 26, 2010

(65) Prior Publication Data

US 2011/0173399 A1   Jul. 14, 2011

Related U.S. Application Data

(60) Provisional application No. 61/293,611, filed on Jan. 8, 2010.

(51) Int. Cl.
*G06F 15/16* (2006.01)
*G06F 12/00* (2006.01)

(52) U.S. Cl.
USPC ............................ 709/206; 711/154; 711/200

(58) Field of Classification Search
USPC .................................. 709/206; 711/154, 200
See application file for complete search history.

(56) References Cited

U.S. PATENT DOCUMENTS

| | | | | |
|---|---|---|---|---|
| 5,361,363 | A | * | 11/1994 | Wells et al. ...................... 712/22 |
| 5,495,619 | A | * | 2/1996 | May et al. ...................... 709/245 |
| 5,598,408 | A | * | 1/1997 | Nickolls et al. ............... 370/351 |
| 6,738,881 | B1 | | 5/2004 | Ollivier et al. |
| 7,330,432 | B1 | * | 2/2008 | Revsin et al. .................. 370/235 |
| 2004/0073635 | A1 | * | 4/2004 | Narad et al. .................... 709/221 |
| 2004/0078482 | A1 | * | 4/2004 | Blumrich et al. .............. 709/238 |
| 2006/0215620 | A1 | * | 9/2006 | Ou et al. ......................... 370/338 |

* cited by examiner

*Primary Examiner* — Boris Gorney
(74) *Attorney, Agent, or Firm* — Scully, Scott, Murphy & Presser, P.C.; Daniel P. Morris, Esq.

(57) ABSTRACT

A method and apparatus for distributed parallel messaging in a parallel computing system. The apparatus includes, at each node of a multiprocessor network, multiple injection messaging engine units and reception messaging engine units, each implementing a DMA engine and each supporting both multiple packet injection into and multiple reception from a network, in parallel. The reception side of the messaging unit (MU) includes a switch interface enabling writing of data of a packet received from the network to the memory system. The transmission side of the messaging unit, includes switch interface for reading from the memory system when injecting packets into the network.

17 Claims, 21 Drawing Sheets

102

| WORD (8 BYTE) NUMBER | BYTE NUMBER | FUNCTION | |
|---|---|---|---|
| 0 | 0 - 3 | PREFETCH ONLY | ~411 |
| | 4 - 7 | SET MESSAGE INTERRUPT | ~412 |
| 1 | 8 - 15 | INJECTION PAYLOAD STARTING ADDRESS | ~413 |
| 2 | 16 - 23 | MESSAGE LENGTH | ~414 |
| 3 | 24 - 31 | TORUS INJECTION FIFO MAP | ~415 |
| 4 - 7 | 32 - 63 | PACKET HEADER | ~410 |

FIG. 8

| BYTE NUMBER | FUNCTION |
|---|---|
| 0 | DATA PACKET TYPE 0x55 |
| 1 | HINT BITS FOR DIMENSIONS A-D |
| 2 | BIT 0-1, HINT BITS FOR E DIMENSION<br>BIT 2, ROUTE TO I/O NODE<br>BIT 3-4, RETURN FORM I/O NODE, "01" USE TORUS PORT 6, "10" USE TORUS PORT 7, "11" USE I/O PORT<br>BIT 5, DYNAMIC<br>BIT 6, DEPOSIT<br>BIT 7, INTERRUPT |
| 3 | BIT 0-2, VIRTUAL CHANNEL (0 DYNAMIC, 1 DETERMINISTIC (ESCAPE), 2 HIGH PRIORITY, 3 SYSTEM, 4 USER COMMWORLD, 5 USER SUBCOMMUNICATOR, 6 SYSTEM COLLECTIVE<br>BIT 3-4, ZONE ROUTING ID<br>BIT 5, STAY ON BUBBLE<br>BIT 6-7, RESERVED |
| 4-7 | BIT 0-1, RESERVED<br>BIT 2-7, A DESTINATION ADDRESS<br>BIT 8-13, B DESTINATION ADDRESS<br>BIT 14-19, C DESTINATION ADDRESS<br>BIT 20-25, D DESTINATION ADDRESS<br>BIT 26-31, E DESTINATION ADDRESS |
| 8 | BIT 0-1, MESSAGE UNIT PACKET TYPE ("00" FIFO, "01" PUT, "10" GET, "11" PACED-GET)<br>BIT 2, RESERVED<br>BIT 3-7, SIZE |
| 9 | BIT 0-2, RESERVED<br>BIT 3-7, DUPLICATED SIZE |
| 10 | LINK SEQUENCE NUMBER |
| 11 | HEADER 8 BIT CRC |

| BYTE NUMBER | FUNCTION |
|---|---|
| 0 | DATA PACKET TYPE 0x5A |
| 1 | BIT 0-3, COLLECTIVE OP CODE<br>"0000"=AND<br>"0001"=OR,<br>"0010"=NOR,<br>"0100"=UNSIGNED ADD, "0101"=UNSIGNED MIN, "0110"=UNSIGNED MAX,<br>"1000"=SIGNED ADD,<br>"1001"=SIGNED MIN,<br>"1010"=SIGNED MAX,<br>"1100"=FLOATING POINT ADD, "1101"= FLOATING POINT MIN, "1110"= FLOATING POINT MAX.<br>BIT 4-7, COLLECTIVE WORD LENGTH EXPONENT (N) |
| 2 | BIT 0-3, COLLECTIVE CLASS ROUTE<br>BIT 4-6, RESERVED<br>BIT 7, INTERRUPT |
| 3 | BIT 0-2, VIRTUAL CHANNEL (0 DYNAMIC, 1 DETERMINISTIC (ESCAPE), 2 HIGH PRIORITY, 3 SYSTEM, 4 USER COMMONWORLD, 5 USER SUBCOMMUNICATOR, 6 SYSTEM COLLECTIVE)<br>BIT 3-4, COLLECTIVE TYPE ("00" BROADCAST, "11" REDUCE, "10" ALL-REDUCE, "01") RESERVED/POSSIBLE POINT-POINT OVER COLLECTIVE ROUTE<br>BIT 5-7, RESERVED |
| 4-7 | BIT 0-1, RESERVED<br>BIT 2-7, A DESTINATION ADDRESS<br>BIT 8-13, B DESTINATION ADDRESS<br>BIT 14-19, C DESTINATION ADDRESS<br>BIT 20-25, D DESTINATION ADDRESS<br>BIT 26-31, E DESTINATION ADDRESS |
| 8 | BIT 0-1, MESSAGE UNIT PACKET TYPE("00" FIFO, "01" PUT, "10" GET, "11" PACED-GET)<br>BIT 2, RESERVED<br>BIT 3-7, SIZE |

FIG. 9B

| 502 BYTE NUMBER | 530 MEMORY FIFO | 540 DIRECT PUT | 550 REMOTE GET |
|---|---|---|---|
| 12-13 | BIT 0-9, REC. FIFO ID<br><br>BIT 10, UNUSED / UNCHANGED BY THE HARDWARE<br><br>BIT 11-15, PUT OFFSET (MSB 5 BITS) | BIT 0-9, REC. PAYLOAD BASE ADDRESS ID<br><br>BIT 11-15, PUT OFFSET (MSB 5 BITS) | BIT 0-9, REMOTE GET INJECTION FIFO ID<br>BIT 10, UNUSED / UNCHANGED BY THE HARDWARE<br>BIT 11-15, UNUSED / UNCHANGED BY HARDWARE |
| 14-17 | PUT OFFSET (LSB 32 BITS) INITIAL VALUE OF PUT OFFSET IS SPECIFIED HERE BY SOFTWARE AND UPDATED FOR EACH PACKET BY THE HARDWARE | PUT OFFSET (LSB 32 BITS) INITIAL VALUE OF PUT OFFSET IS SPECIFIED HERE BY SOFTWARE AND UPDATED FOR EACH PACKET BY THE HARDWARE | UNUSED UNCHANGED BY THE HARDWARE |
| 18-19 | UNUSED / UNCHANGED BY THE HARDWARE | BIT 0-5, UNUSED<br>BIT 6-15, REC. COUNTER ID (SET BY SOFTWARE) | UNUSED / UNCHANGED BY THE HARDWARE |
| 20-21 | UNUSED / UNCHANGED BY THE HARDWARE | VALID BYTES IN PACKET PAYLOAD (FILLED IN BY HARDWARE) | UNUSED / UNCHANGED BY THE HARDWARE |
| 22-23 | UNUSED / UNCHANGED BY THE HARDWARE | UNUSED | UNUSED / UNCHANGED BY THE HARDWARE |
| 24-31 | UNUSED / UNCHANGED BY THE HARDWARE | COUNTER OFFSET (LSB 37 BITS) SET BY SOFTWARE | UNUSED / UNCHANGED BY THE HARDWARE |

| imFIFO START ADDRESS: | |
|---|---|
| imFIFO SIZE-MINUS-ONE: | |
| imFIFO HEAD POINTER: | |
| imFIFO TAIL POINTER: | |
| imFIFO DESCRIPTOR COUNTER: | |
| imFIFO FREE SPACE: | |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
|   |   |   |   |   |   |   |   |   |   |    |    |    |    | D0 | D1 |

BUF(0 TO 15) HOLDS 16-BYTE WRITE DATA LINE

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 0 | 0 | 0 | 0 | 0 | 0 | 0 | 0 | 0 | 0  | 0  | 0  | 0  | 1  | 1  |

BE(0 TO 15) HOLDS 16-BIT BYTE ENABLE SIGNAL

FIG. 14C

| 0  | 1  | 2  | 3  | 4  | 5  | 6  | 7  | 8  | 9  | 10  | 11  | 12  | 13  | 14  | 15  |
|----|----|----|----|----|----|----|----|----|----|-----|-----|-----|-----|-----|-----|
| D2 | D3 | D4 | D5 | D6 | D7 | D8 | D9 | D10| D11| D12 | D13 | D14 | D15 | D16 | D17 |

BUF(0 TO 15) HOLDS 16-BYTE WRITE DATA LINE

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 1 | 1 | 1 | 1 | 1 | 1 | 1 | 1 | 1 | 1  | 1  | 1  | 1  | 1  | 1  |

BE(0 TO 15) HOLDS 16-BIT BYTE ENABLE SIGNAL

FIG. 14D

| 0   | 1   | 2  | 3  | 4  | 5  | 6  | 7  | 8  | 9  | 10  | 11  | 12  | 13  | 14  | 15  |
|-----|-----|----|----|----|----|----|----|----|----|-----|-----|-----|-----|-----|-----|
| D18 | D19 | D4 | D5 | D6 | D7 | D8 | D9 | D10| D11| D12 | D13 | D14 | D15 | D16 | D17 |

BUF(0 TO 15) HOLDS 16-BYTE WRITE DATA LINE

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 1 | 0 | 0 | 0 | 0 | 0 | 0 | 0 | 0 | 0  | 0  | 0  | 0  | 0  | 0  |

BE(0 TO 15) HOLDS 16-BIT BYTE ENABLE SIGNAL

DISTRIBUTED PARALLEL MESSAGING FOR MULTIPROCESSOR SYSTEMS

CROSS-REFERENCE TO RELATED APPLICATIONS

This application relates to and claims the benefit of the filing date of commonly-owned, U.S. Provisional Patent Application Ser. No. 61/293,611 entitled A MULTI-PETASCALE HIGHLY EFFICIENT PARALLEL SUPERCOMPUTER filed on Jan. 8, 2010 and incorporated by reference as if fully set forth herein. This application relates to commonly-owned, U.S. Pat. No. 8,086,766 entitled SUPPORT FOR NON-LOCKING PARALLEL RECEPTION OF PACKETS BELONGING TO THE SAME RECEPTION FIFO] filed on even date herewith and incorporated by reference as if fully set forth herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

BACKGROUND

The present invention relates to computer systems having multiprocessor architectures and, more particularly, to a distributed parallel messaging unit for high throughput networks.

To achieve high performance computing, multiple individual processors have been interconnected to form a multiprocessor computer system capable of parallel processing. Multiple processors can be placed on a single chip, or several chips—each containing one or more processors—become interconnected to form single- or multi-dimensional computing networks into a multiprocessor computer system, such as described in co-pending U.S. Patent Publication No. 2009/0006808 A1 corresponding to U.S. patent application Ser. No. 11/768,905, the whole contents and disclosure of which is incorporated by reference as if fully set forth herein, describing a massively parallel supercomputing system.

Some processors in a multiprocessor computer system, such as a massively parallel supercomputing system, typically implement some form of direct memory access (DMA) functionality that facilitates communication of messages within and among network nodes, each message including packets containing a payload, e.g., data or information, to and from a memory system, e.g., a memory system shared among one or more processing elements.

Generally, a uni- or multi-processor system communicates with a single DMA engine to initialize data transfer between the memory system and a network device (or other I/O device). However, with increasing bandwidth requirements (and increased number of processors on a chip), a single DMA can not keep up with the volume of message communication operations required for high performance compute and I/O collective operations.

Further in the art, multi-channel DMAs that provide multiple channels from one source to one destination in a time multiplexed manner (such as described in U.S. Pat. No. 6,738,881) and with scheduled ports.

In a highly optimized high-bandwidth system, it is desirable to provide for alternate system architectures, for example such as star, or point-to-point implementations.

It would thus be desirable to provide in a multiprocessor system a distributed parallel messaging unit for configuring high throughput networks, for example, that implement such alternate system architectures.

SUMMARY

In one aspect there is provided an architecture of a distributed parallel messaging unit ("MU") for high throughput networks, wherein a messaging unit at one or more nodes of a network includes a plurality of messaging elements ("MEs"). In one embodiment, each ME operates in parallel and includes a DMA element for handling message transmission (injection) or message reception operations.

According to one aspect, there is provided a messaging system and method for a parallel computing device having a plurality of nodes, each node having multiple processor units and associated memory system operatively connected therewith via an interconnect device, the messaging system comprising at each node:

a plurality of network transmit devices for transmitting message packets over a network;

injection control unit for receiving and processing requests from processor units at a node for transmitting messages over a network via one or more network transmit devices;

a plurality of injection messaging engine units (iMEs), each injection messaging engine unit operatively connected with the injection control unit and configured to read data from the associated memory system via the interconnect device, and forming a packet belonging to the message, the packet including a packet header and the read data;

wherein, at the node, two or more packets associated with two or more different messages may be simultaneously formed by a respective two or more injection messaging engine units, in parallel, for simultaneous transmission over the network.

Further to this aspect, there is additionally provided:

a plurality of receiver devices for receiving message packets from a network, a network reception queue associated with a receiver device, each network reception queue adapted to buffer the received packet, a reception control unit for receiving information from a processor at a node for handling of packets received over a network; and, a plurality of reception messaging engine units (rMEs), a reception messaging engine unit operatively connected with the reception control unit, the reception messaging engine unit initiates transfer of the received packet to the associated memory system, wherein, two or more packets may be simultaneously processed by a respective two or more reception messaging engine units, in parallel, for simultaneous reception over the network.

In a further aspect, there is provided a method for communicating messages in a parallel computing system having a plurality of nodes, each node having multiple processor units and an associated memory system operatively connected therewith via an interconnect device, the method comprising: receiving, at a first control unit, requests from processor units for transmitting messages over a network via one or more network transmit devices, a request specifying a target address in the associated memory system having data to be included in a message to be transmitted; reading, at one of a plurality of injection messaging engine units (iMEs), data at the specified target address in the associated memory system, the data communicated to an injection messaging engine unit coupled to the memory system via an interconnect device; and forming a packet belonging to the message at a network injection queue associated with an injection messaging engine unit at the node, each injection queue further corresponding to a respective network transmit device for transmitting the packet over the network, wherein, at the node, two or more packets associated with two or more different messages are simultaneously formed in parallel at a respective network injection queue for simultaneous transmission over the network.

In a further aspect there is provided a method for receiving messages in a parallel computing system having a plurality of nodes, each node having multiple processor units and an associated memory system operatively connected therewith via an interconnect device, the method comprising: receiving, at a network receiver device of a plurality of network receiver devices, a packet associated with a message and storing the packet at a network reception buffer; each of the plurality of network receiver device having a corresponding network reception buffer; receiving, at a reception control unit, information from a processor at a node for handling of packets associated with messages received over a network, the received information specifying pointers to addresses in the associated memory system where data received from a message packet is to be stored; receiving, at a reception messaging engine unit (rME) associated with the network reception buffer, a packet header of the received packet, each reception messaging engine unit corresponding to a network reception queue operatively connected with the reception control unit; identifying from the packet header, at the reception messaging engine unit, a type of packet received, receiving, at the reception messaging engine unit, based on an identified packet type, a pointer address from the reception control unit; and, transferring the received packet from the network reception buffer to a location in the associated memory system specified by the pointer.

BRIEF DESCRIPTION OF THE DRAWINGS

The objects, features and advantages of the present invention will become apparent to one skilled in the art, in view of the following detailed description taken in combination with the attached drawings, in which:

FIG. 8 depicts an example layout of a message descriptor 102.

FIG. 9 depicts a layout of a packet header 500 communicated in the system of the present invention including first header portions 501 depicted in FIG. 9A and alternate first header portion 501' depicted in FIG. 9B; and second header portion 502;

FIG. 10 depicts exemplary configuration of remaining bytes of the each network packet or collective packet header of FIGS. 9A, 9B;

FIG. 11 depicts an example ICSRAM structure and contents therein according to one embodiment;

FIGS. 14A-14D depict a packet payload storage 16 Byte alignment example according to one embodiment; and, FIG. 15 illustrates interrupt signals that can be generated from the MU for receipt at the processor cores at a compute node.

DETAILED DESCRIPTION

The present invention is directed to a distributed parallel messaging unit ("MU") architecture for high throughput networks, wherein a messaging unit at one or more nodes of such network includes a plurality of messaging elements ("MEs"). In one embodiment, each ME includes a multi-channel direct memory access (DMA) element operating in parallel for handling both message transmission (injection) and message reception operations. In the distributed parallel messaging unit (MU) architecture, each ME implementing parallel DMA functionality operates under distributed control: not a single processor or control state machine coordinates the parallel operation of the MEs, but rather data control initiates simultaneous operation of a plurality of MEs on both message reception and injection side.

The Multiple distributed physical MEs are not time shared, i.e., the multiple MEs per node share a single chip interconnect port and the MEs operate in parallel controlled by data flow without implementing control logic for time-sharing.

The multiple MEs per node share an interconnect port, configuration logic, and further, the MEs serve multiple network interfaces (single network, or on multiple different networks, or local copy). Multiple MEs per node thus can work on the same message in parallel, and physically, MEs can be integrated within a single node, or on a single chip.

Figure 1:
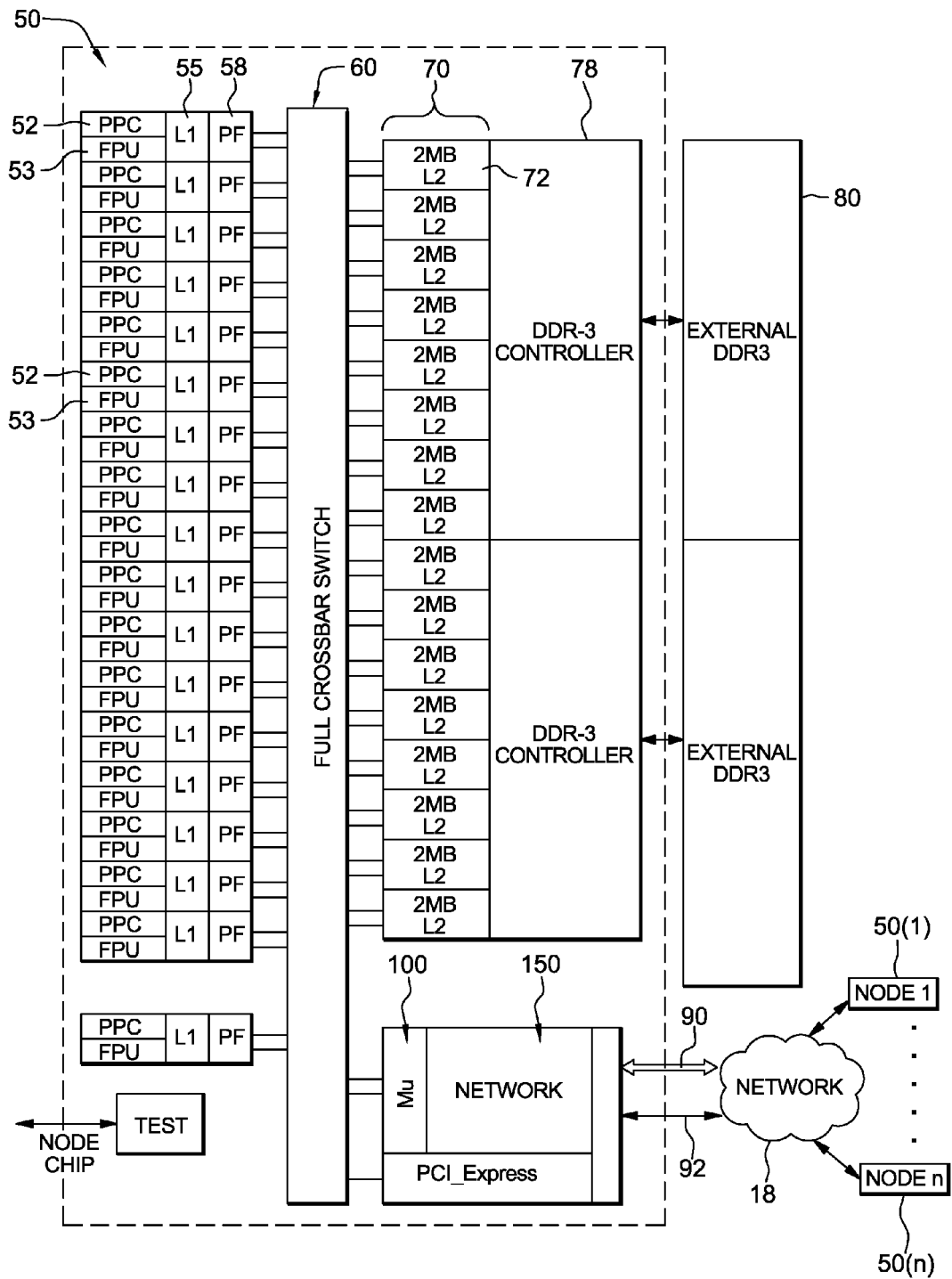
FIG. 1 depicts a schematic of a computing nodechip employing a Messaging Unit including DMA functionality for a massively parallel computing system according to one embodiment.

FIG. 1 depicts a schematic of a single network compute node 50 in a parallel computing system having a plurality of like nodes each node employing a Messaging Unit 100 according to one embodiment. The computing node 50 for example may be one node in a parallel computing system architecture such as a BluGene®/Q massively parallel computing system comprising 1024 compute nodes 50(1), . . . 50(n), each node including multiple processor cores and each node connectable to a network such as a torus network, or a collective.

A compute node of this present massively parallel supercomputer architecture and in which the present invention may be employed is illustrated in FIG. 1. The compute nodechip 50 is a single chip ASIC ("Nodechip") based on low power processing core architecture, though the architecture can use any low power cores, and may comprise one or more semiconductor chips. In the embodiment depicted, the node employs PowerPC® A2 at 1600 MHz, and support a 4-way multi-threaded 64 b PowerPC implementation. Although not shown, each A2 core has its own execution unit (XU), instruction unit (IU), and quad floating point unit (QPU or FPU) connected via an AXU (Auxiliary eXecution Unit). The QPU is an implementation of a quad-wide fused multiply-add SIMD QPX floating point instruction set architecture, producing, for example, eight (8) double precision operations per cycle, for a total of 128 floating point operations per cycle per compute chip. QPX is an extension of the scalar PowerPC floating point architecture. It includes multiple, e.g., thirty-two, 32B-wide floating point registers per thread.

As described herein, one use of the letter "B" represents a Byte quantity, e.g., 2B, 8B, 32B, and 64B represent Byte units. Recitations "GB" represent Gigabyte quantities.

More particularly, the basic nodechip 50 of the massively parallel supercomputer architecture illustrated in FIG. 1 includes multiple symmetric multiprocessing (SMP) cores 52, each core being 4-way hardware threaded supporting transactional memory and thread level speculation, and, including the Quad Floating Point Unit (FPU) 53 on each core. In one example implementation, there is provided sixteen or seventeen processor cores 52, plus one redundant or back-up processor core, each core operating at a frequency target of 1.6 GHz providing, for example, a 563 GB/s bisection bandwidth to shared L2 cache 70 via an interconnect device 60, such as a full crossbar switch. In one example embodiment, there is provided an associated memory system including 32 MB of shared L2 cache 70, and external memory 80, as a lower level in the memory hierarchy in communication with the L2. In one embodiment, the compute node employs or is provided with 8-16 GB memory/node. Further, in one embodiment, the node includes 1.333 GHz DDR3 SDRAM with 42.6 GB/s bandwidth (2 channels each with chip kill protection).

Each FPU 53 associated with a core 52 provides a 32B wide data path to the L1-cache 55 of the A2, allowing it to load or store 32B per cycle from or into the L1-cache 55. Each core 52 is directly connected to a private prefetch unit (level-1 prefetch, L1P) 58, which accepts, decodes and dispatches all requests sent out by the A2. The store interface from the A2 core 52 to the L1P 58 is 16B wide, in one example embodiment, and the load interface is 32B wide, both operating at processor frequency. The L1P 58 implements a fully associative, 32 entry prefetch buffer, each entry holding an L2 line of 128B size, in one embodiment. The L1P provides two prefetching schemes for the private prefetch unit 58: a sequential prefetcher, as well as a list prefetcher.

As shown in FIG. 1, the shared L2 70 may be sliced into 16 units, each connecting to a slave port of the crossbar switch (Xbar) 60. Every physical address is mapped to one slice using a selection of programmable address bits or a XOR-based hash across all address bits. The L2-cache slices, the L1Ps and the L1-D caches of the A2s are hardware-coherent.

Network packet I/O functionality at the node is provided and data throughput increased by implementing MU 100. Each MU at a node includes multiple parallel operating DMA engines, each in communication with the Xbar, and a Network Interface Unit 150. In one embodiment, the Network Interface Unit of the compute node includes, in a non-limiting example: 10 intra-rack and inter-rack interprocessor links 90, each operating at 2.0 GB/s, that, in one embodiment, may be configurable as a 5-D torus, for example; and, one I/O link 92 interfaced with the Network Interface Unit 150 at 2.0 GB/s (i.e., a 2 GB/s I/O link (to an I/O subsystem)) is additionally provided.

Figure 2:
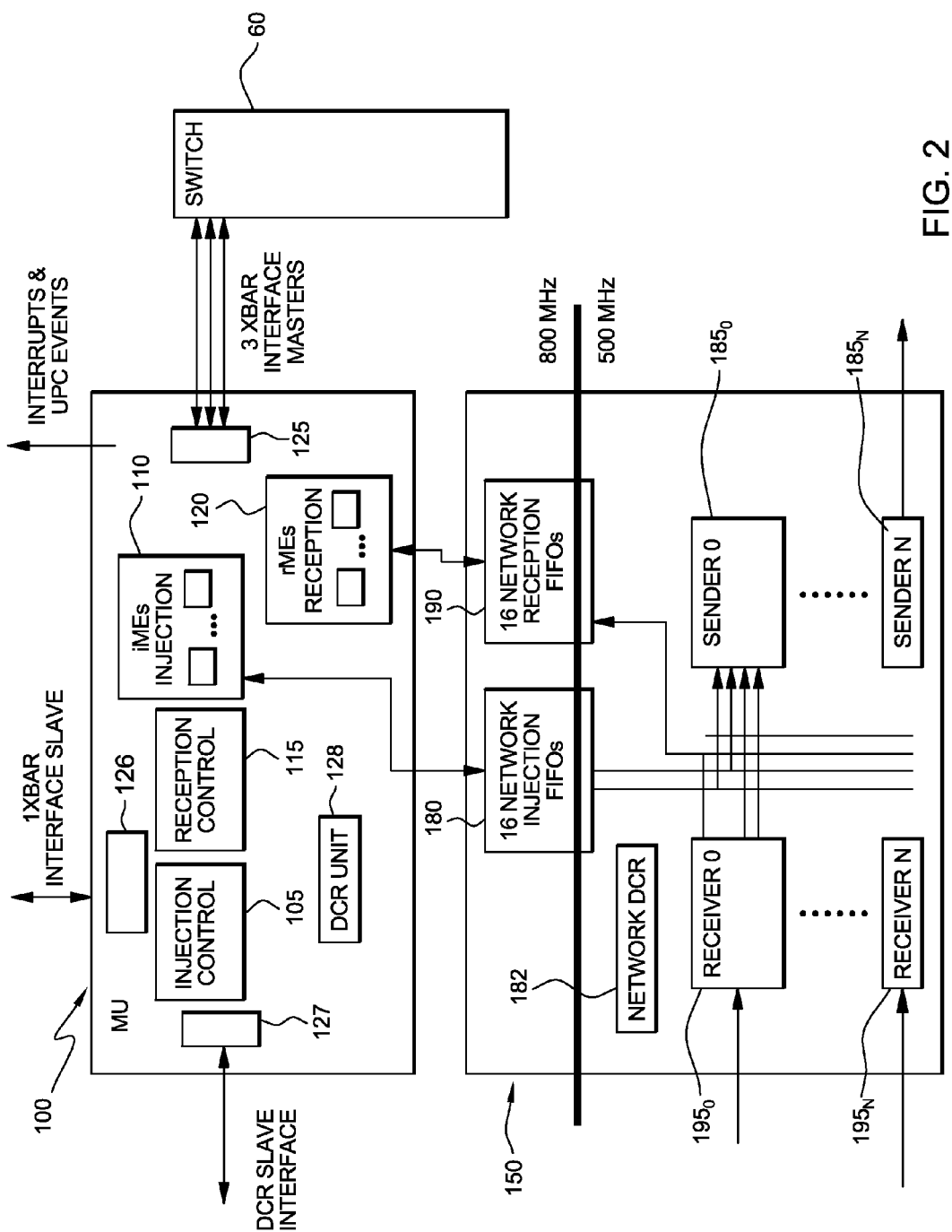
FIG. 2 is a top level architecture of the Messaging Unit 100 interfacing with the Network Interface Unit 150 according to one embodiment.

The top level architecture of the Messaging Unit 100 interfacing with the Network Interface Unit 150 is shown in FIG. 2. The Messaging Unit 100 functional blocks involved with packet injection control as shown in FIG. 2 includes the following: an Injection control unit 105 implementing logic for queuing and arbitrating the processors' requests to the control areas of the injection MU; and, a plurality of iMEs (injection messaging engine units) 110 that read data from L2 cache or DDR memory and insert it in the network injection FIFOs 180. In one embodiment, there are 16 iMEs 110, one for each network injection FIFO 180. The Messaging Unit 100 functional blocks involved with packet reception control as shown in FIG. 2 include a Reception control unit 115 implementing logic for queuing and arbitrating the requests to the control areas of the reception MU; and, a plurality of rMEs (reception messaging engine units) 120 that read data from the network reception FIFOs 190, and insert them into the associated memory system. In one embodiment, there are 16 rMEs 120, one for each network reception FIFO 190. A DCR control Unit 128 is provided that includes DCR (control) registers for the MU 100.

As shown in FIG. 2, the herein referred to Messaging Unit, "MU" such as MU 100 implements plural direct memory access engines to offload the Network Interface Unit 150. In one embodiment, it transfers blocks via three Xbar interface masters 125 between the memory system and the network reception FIFOs 190 and network injection FIFOs 180 of the Network Interface Unit 150. Further, in one embodiment, L2 cache controller accepts requests from the Xbar interface masters 125 to access the memory system, and accesses either L2 cache 70 or the external memory 80 to satisfy the requests. The MU is additionally controlled by the cores via memory mapped I/O access through an additional switch slave port 126.

In one embodiment, one function of the messaging unit 100 is to ensure optimal data movement to, and from the network into the local memory system for the node by supporting injection and reception of message packets. As shown in FIG. 2, in the Network Interface Unit 150 the network injection FIFOs 180 and network reception FIFOs 190 (sixteen for example) each comprise a network logic device for communicating signals used for controlling routing data packets, and a memory for storing multiple data arrays. Each network injection FIFOs 180 is associated with and coupled to a respective network sender device $185_n$ (where n=1 to 16 for example), each for sending message packets to a node, and each network reception FIFOs 190 is associated with and coupled to a respective network receiver device $195_n$ (where n=1 to 16 for example), each for receiving message packets from a node. A network DCR (device control register) 182 is provided that is coupled to the network injection FIFOs 180, network reception FIFOs 190, and respective network receivers 195, and network senders 185. A complete description of the DCR architecture is available in IBM's Device Control Register Bus 3.5 Architecture Specifications Jan. 27, 2006, which is incorporated by reference in its entirety. The network logic device controls the flow of data into and out of the network injection FIFO 180 and also functions to apply 'mask bits' supplied from the network DCR 182. In one embodiment, the rMEs communicate with the network FIFOs in the Network Interface Unit 150 and receives signals from the network reception FIFOs 190 to indicate, for example, receipt of a packet. It generates all signals needed to read the packet from the network reception FIFOs 190. This Network Interface Unit 150 further provides signals from the network device that indicate whether or not there is space in the network injection FIFOs 180 for transmitting a packet to the network and can also be configured to write data to the selected network injection FIFOs.

The MU 100 further supports data prefetching into the L2 cache 70. On the injection side, the MU splits and packages messages into network packets, and sends packets to the network respecting the network protocol. On packet injection, the messaging unit distinguishes between packet injection and memory prefetching packets based on certain control bits in the message descriptor, e.g., such as a least significant bit of a byte of a descriptor 102 shown in FIG. 8. A memory prefetch mode is supported in which the MU fetches a message into L2, but does not send it. On the reception side, it receives packets from a network, and writes them into the appropriate location in memory system, depending on control information stored in the packet. On packet reception, the messaging unit 100 distinguishes between three different types of packets, and accordingly performs different operations. The types of packets supported are: memory FIFO packets, direct put packets, and remote get packets.

With respect to on-chip local memory copy operation, the MU copies content of an area in the associated memory system to another area in the memory system. For memory-to-memory on chip data transfer, a dedicated SRAM buffer, located in the network device, is used. Injection of remote get packets and the corresponding direct put packets, in one embodiment, can be "paced" by software to reduce contention within the network. In this software-controlled paced mode, a remote get for a long message is broken up into multiple remote gets, each for a sub-message. The sub-message remote get is allowed to enter the network if the number of packets belonging to the paced remote get active in the network is less than an allowed threshold. To reduce contention in the network, software executing in the cores in the same nodechip can control the pacing.

The MU 100 further includes an interface to a crossbar switch (Xbar) 60 in additional implementations. The MU 100 includes three (3) Xbar interface masters 125 to sustain network traffic and one Xbar interface slave 126 for programming. The three (3) Xbar interface masters 125 may be fixedly mapped to the iMEs 110, such that for example, the iMEs are evenly distributed amongst the three ports to avoid congestion. A DCR slave interface unit 127 providing control signals is also provided.

The handover between network device 150 and MU 100 is performed via buffer memory, e.g., 2-port SRAMs, for network injection/reception FIFOs. The MU 100, in one embodiment, reads/writes one port using, for example, an 800 MHz clock (operates at one-half the speed of a processor core clock, e.g., at 1.6 GHz, for example), and the network reads/writes the second port with a 500 MHz clock, for example. The handovers are handled using the network injection/reception FIFOs and FIFOs' pointers (which are implemented using latches, for example).

Figure 3:
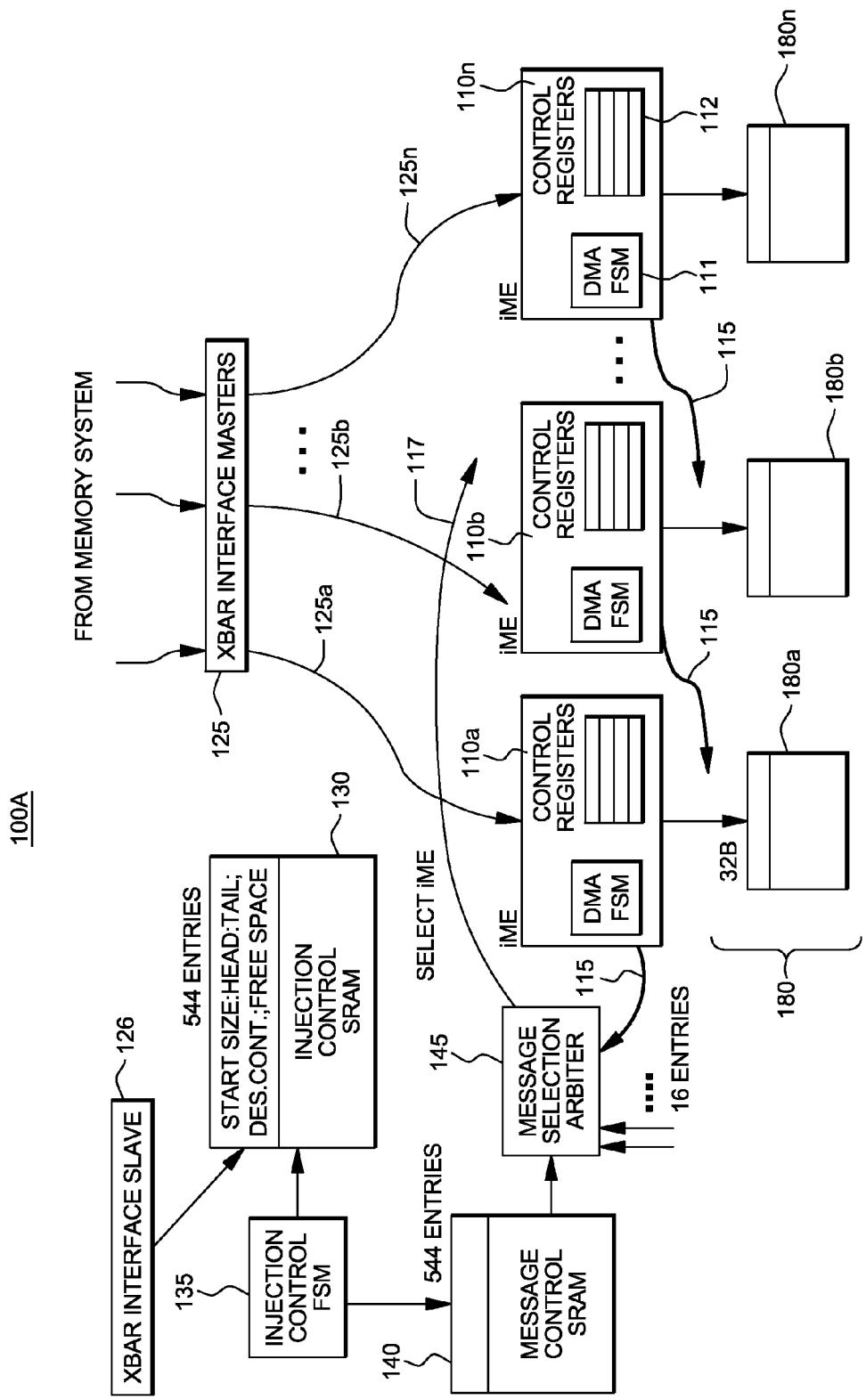
FIG. 3 is a high level schematic of the injection side 100A of the Messaging Unit 100 of FIG. 2, employing multiple parallel operating DMA engines for network packet injection.

As shown in FIG. 3 illustrating a more detailed schematic of the Messaging Unit 100 of FIG. 2, multiple parallel operating DMA engines are employed for network packet injection, the Xbar interface masters 125 run at a predetermined clock speed, and, in one embodiment, all signals are latch bound. The Xbar write width is 16 bytes, or about 12.8 GB/s peak write bandwidth per Xbar interface master in the example embodiment. In this embodiment, to sustain a 2*10 GB/s=20 GB/s 5-D torus nearest neighbor bandwidth, three (3) Xbar interface masters 125 are provided. Further, in this embodiment, these three Xbar interface masters are coupled with iMEs via ports 125a, 125b, ..., 125n. To program MU internal registers for the reception and injection sides, one Xbar interface slave 126 is used.

As further shown in FIG. 3, there are multiple iMEs (injection messaging engine units) 110a,110b, ...,110n in correspondence with the number of network injection FIFOs, however, other implementations are possible. In the embodiment of the MU injection side 100A depicted, there are sixteen iMEs 110 for each network injection FIFO. Each of the iMEs 110a,110b, ...,110n includes a DMA element including an injection control state machine 111, and injection control registers 112. Each iMEs 110a,110b, ...,110n initiates reads from the message control SRAM (MCSRAM) 140 to obtain the packet header and other information, initiates data transfer from the memory system and, write back updated packet header into the message control SRAM 140. The control registers 112 each holds packet header information, e.g., a subset of packet header content, and other information about the packet currently being moved. The DMA injection control state machine 111 initiates reads from the message control SRAM 140 to obtain the packet header and other information, and then it initiates data transfer from the memory system to a network injection FIFO.

In an alternate embodiment, to reduce size of each control register 112 at each node, only a small portion of packet information is stored in each iME that is necessary to generate requests to switch 60. Without holding a full packet header, an iME may require less than 100 bits of storage. Namely, each iME 110 holds pointer to the location in the memory system that holds message data, packet size, and miscellaneous attributes.

Header data is sent from the message control SRAM 140 to the network injection FIFO directly; thus the iME alternatively does not hold packet headers in registers. The Network Interface Unit 150 provides signals from the network device to indicate whether or not there is space available in the paired network injection FIFO. It also writes data to the selected network injection FIFOs.

Figure 3A:
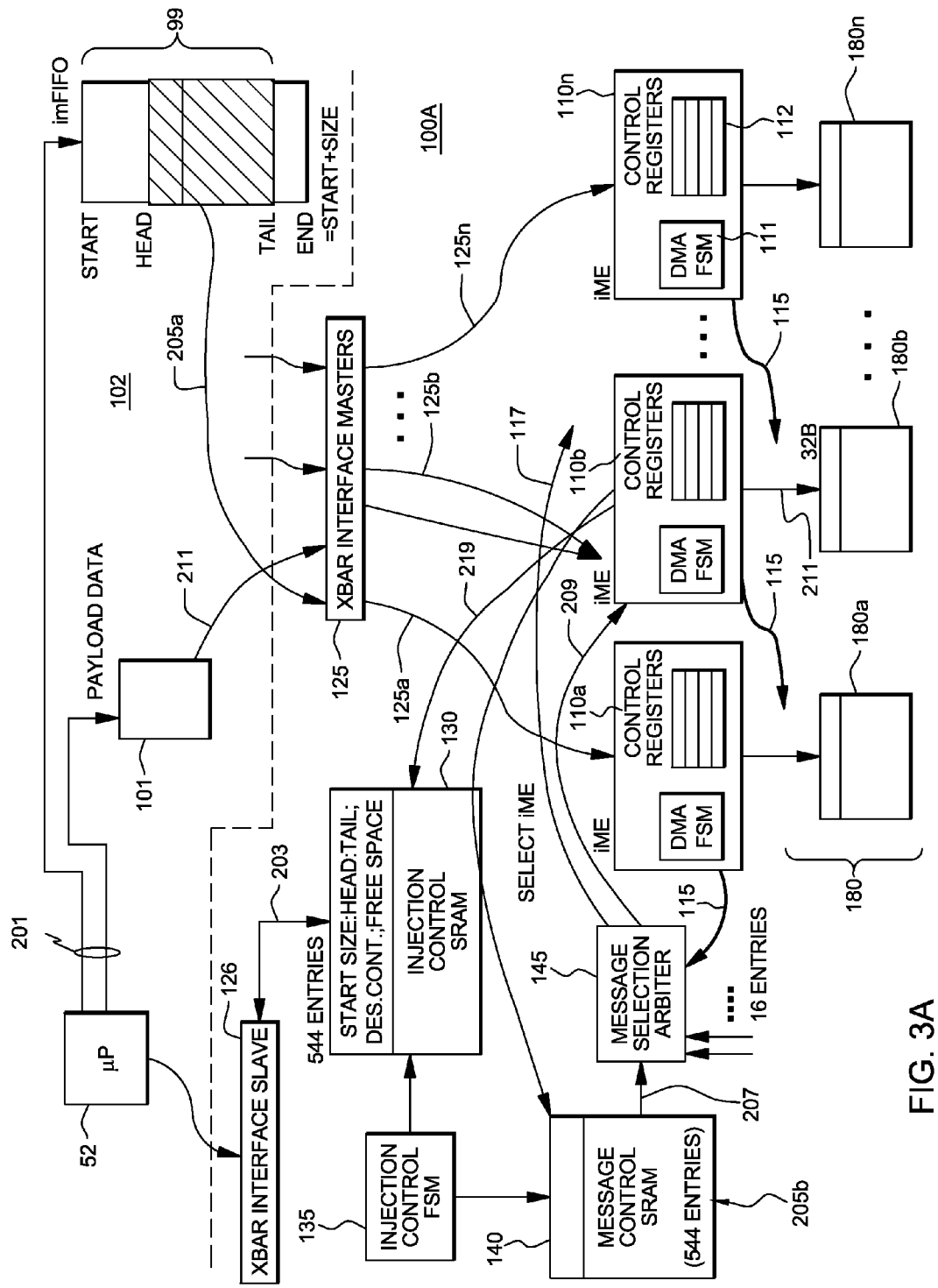
FIG. 3A is a detailed high level schematic of the injection side 100A of the Messaging Unit 100, depicting injection side methodology according to one embodiment.

As shown in FIG. 3A, the Xbar interface masters 125 generate external connection to Xbar for reading data from the memory system and transfer received data to the correct iME/network interface. To reduce the size of the hardware implementation, in one embodiment, iMEs 110 are grouped into clusters, e.g., clusters of four, and then it pairs (assigns) one or more clusters of iMEs to a single Xbar interface master. At most one iME per Xbar interface master can issue a read request on any cycle for up to three (3) simultaneous requests (in correspondence to the number of Xbar interface masters, e.g., three (3) Xbar interface masters). On the read data return side, one iME can receive return data on each master port. In this embodiment of MU injection side 100A, it is understood that more than three iMEs can be actively processing at the same time, but on any given clock cycle three can be requesting or reading data from the Xbar 60, in the embodiment depicted. The injection control SRAM 130 is also paired with one of the three master ports, so that it can fetch message descriptors from memory system, i.e., Injection memory FIFOs. In one embodiment, each iME has its own request and acknowledgement signal lines connected to the corresponding Xbar interface master. The request signal is from iME to Xbar interface master, and the acknowledgement signal is from Xbar interface master to iME. When an iME wants to read data from the memory system, it asserts the request signal. The Xbar interface master selects one of iMEs requesting to access the memory system (if any). When Xbar interface master accepts a request, it asserts the acknowledgement signal to the requesting iME. In this way iME knows when the request is accepted. The injection control SRAM has similar signals connected to a Xbar interface master (i.e. request and acknowledgement signals). The Xbar interface master treats the injection control SRAM in the same way as an iME.

FIG. 3 further shows internal injection control status registers 112 implemented at each iME of the MU device that receive control status data from message control SRAM. These injection control status registers include, but are not limited to, registers for storing the following: control status data including pointer to a location in the associated memory system that holds message data, packet size, and miscellaneous attributes. Based on the control status data, iME will read message data via the Xbar interface master and store it in the network injection FIFO.

FIG. 3A depicts in greater detail those elements of the MU injection side 100A for handling the transmission (packet injection) for the MU 100. Messaging support including packet injection involves packaging messages into network packets and, sending packets respecting network protocol. The network protocol includes point-to-point and collective. In the point-to-point protocol, the packet is sent directly to a particular destination node. On the other hand, in the collective protocol, some operations (e.g. floating point addition) are performed on payload data across multiple packets, and then the resulting data is sent to a receiver node.

For packet injection, the Xbar interface slave 126 programs injection control by accepting write and read request signals from processors to program SRAM, e.g., an injection control SRAM (ICSRAM) 130 of the MU 100 that is mapped to the processor memory space. In one embodiment, Xbar interface slave processes all requests from the processor in-order of arrival. The Xbar interface masters generate connection to the Xbar 60 for reading data from the memory system, and transfers received data to the selected iME element for injection, e.g., transmission into a network.

Figure 5:
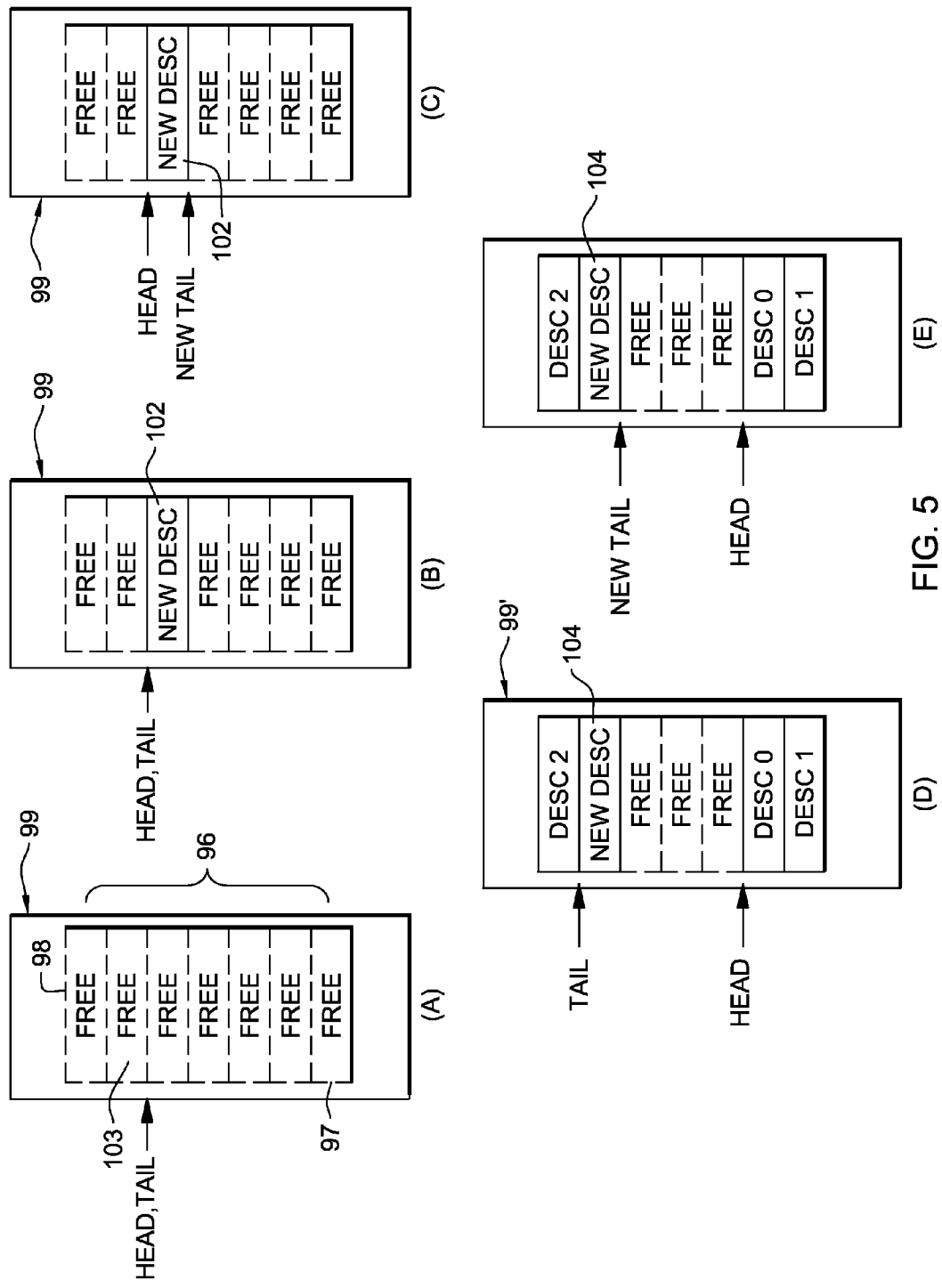
FIG. 5A shows an injection memory FIFO 99 having empty slots 103 for receiving message descriptors.
FIG. 5B shows that a processor has written a single message descriptor 102 into an empty slot 103 in an injection memory FIFO 99 and FIG. 5C shows updating a new tail pointer for MU injection message processing.
FIGS. 5D and 5E show adding a new descriptor to a non-empty imFIFO, e.g., imFIFO 99'.

The ICSRAM 130 particularly receives information about a buffer in the associated memory system that holds message descriptors, from a processor desirous of sending a message. The processor first writes a message descriptor to a buffer location in the associated memory system, referred to herein as injection memory FIFO (imFIFO) shown in FIG. 3A as imFIFO 99. The imFIFO(s) 99, implemented at the memory system in one embodiment shown in FIG. 5A, are implemented as circular buffers having slots 103 for receiving message descriptors and having a start address 98 (indicating the first address that this imFIFO 99 can hold a descriptor), imFIFO size (from which the end address 97 can be calculated), and including associated head and tail pointers to be specified to the MU. The head pointer points to the first descriptor stored in the FIFO, and the tail pointer points to the next free slot just after the last descriptor stored in the FIFO. In other words, the tail pointer points to the location where the next descriptor will be appended. FIG. 5A shows an example empty imFIFO 99, where a tail pointer is the same as the head pointer (i.e., pointing to a same address); and FIG. 5B shows that a processor has written a message descriptor 102 into the empty slot in an injection memory FIFO 99 pointed to by the tail pointer. After storing the descriptor, the processor increments the tail pointer by the size of the descriptor so that the stored descriptor is included in the imFIFO, as shown in FIG. 5C. When the head and tail pointers reach the FIFO end address (=start pointer plus the FIFO size), they wrap around to the FIFO start address. Software accounts for this wrap condition when updating the head and tail pointers. In one embodiment, at each compute node, there are 17 "groups" of imFIFOs, for example, with 32 imFIFOs per group for a total of 544, in an example embodiment. In addition, these groups may be sub-grouped, e.g., 4 subgroups per group. This allows software to assign processors and threads to groups or subgroups. For example, in one embodiment, there are 544 imFIFOs to enable each thread on each core to have its own set of imFIFOs. Some imFIFOs may be used for remote gets and for local copy. It is noted that any processor can be assigned to any group.

Returning to FIG. 3, the message descriptor associated with the message to be injected is requested by the injection control state machine 135 via one of the Xbar interface masters 125. Once retrieved from memory system, the requested descriptor returns via the Xbar interface master and is sent to the message control SRAM 140 for local storage. FIG. 8 depicts an example layout of a message descriptor 102. Each message descriptor describes a single complete packet, or it can describe a large message via a message length (one or more packets) and may be 64 bytes in length, aligned on a 64 byte boundary. The first 32 bytes of the message descriptor includes, in one embodiment, information relevant to the message upon injection, such as the message length 414, where its payload starts in the memory system (injection payload starting address 413), and a bit-mask 415 (e.g., 16 bits for the 16 network injection FIFO's in the embodiment described) indicating into which network injection FIFOs the message may be injected. That is, each imFIFO can use any of the network injection FIFOs, subject to a mask setting in the message descriptor such as specified in "Torus Injection FIFO Map" field 415 specifying the mask, for example, as 16 least significant bits in this field that specifies a bitmap to decide which of the 16 network injection FIFOs can be used for sending the message. The second 32 bytes include the packet header 410 whose content will be described in greater detail herein.

As further shown in FIG. 8, the message descriptor further includes a message interrupt bit 412 to instruct the message unit to send an interrupt to the processor when the last (and only last) packet of the message has been received. For example, when the MU injection side sends the last packet of a message, it sets the interrupt bit (bit 7 in FIG. 9A, field 512). When an rME receives a packet and sees this bit set in the header, it will raise an interrupt. Further, one bit e.g., a least significant bit, of Prefetch Only bits 411, FIG. 8, when set, will cause the MU to fetch the data into L2 only. No message is sent if this bit is set. This capability to prefetch data is from the external memory into the L2. A bit in the descriptor indicates the message as prefetch only and the message is assigned to one of iMEs (any) for local copy. The message may be broken into packets, modified packet headers and byte count. Data is not written to any FIFO.

In a methodology 200 implemented by the MU for sending message packets, ICSRAM holds information including the start address, size of the imFIFO buffer, a head address, a tail address, count of fetched descriptors, and free space remaining in the injection memory FIFO (i.e., start, size, head, tail, descriptor count and free space).

Figure 4:
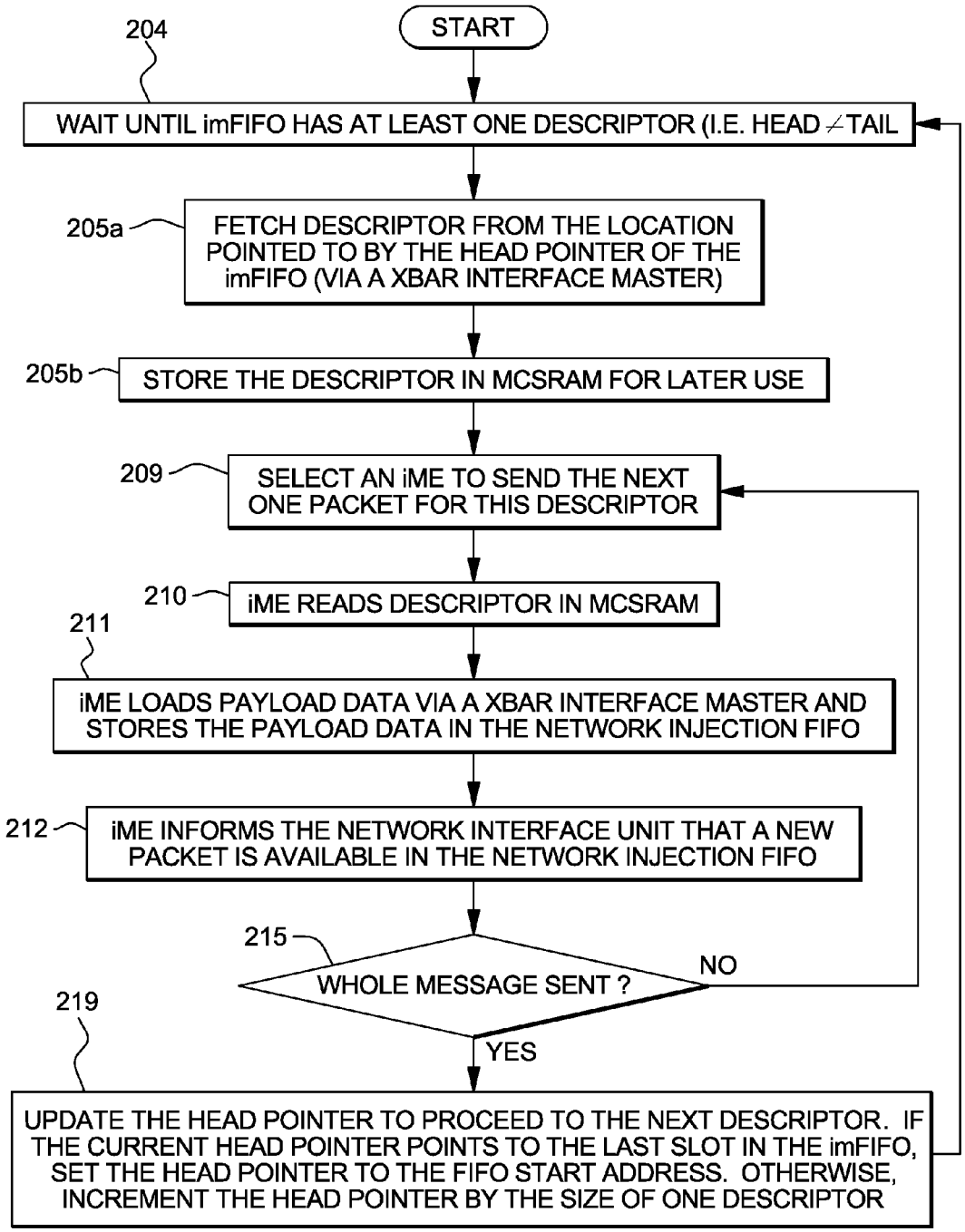
FIG. 4 is a block diagram describing a method implemented in the computing system that is performed on each injection memory FIFO (imFIFO) 99, which is a circular buffer in the associated memory system to store descriptors, for processing the descriptors for injection operations.

As shown in step 204 of FIG. 4, the injection control state machine 135 detects the state when an injection memory FIFO 99 is non-empty, and initiates copying of the message specific information of the message descriptor 102 to the message control SRAM block 140. That is, the state machine logic 135 monitors all write accesses to the injection control SRAM. When it is written, the logic reads out start, size, head, and tail pointers from the SRAM and check if the imFIFO is non-empty. Specifically, an imFIFO is non-empty if the tail pointer is not equal to the head pointer. The message control SRAM block 140 includes information (received from the imFIFO) used for injecting a message to the network including, for example, a message start address, message size in bytes, and first packet header. This message control SRAM block 140 is not memory-mapped (it is used only by the MU itself).

The Message selection arbiter unit 145 receives the message specific information from each of the message control SRAM 140, and receives respective signals 115 from each of the iME engines 110*a*, 110*b*, . . . , 110*n*. Based on the status of each respective iME, Message selection arbiter unit 145 determines if there is any message waiting to be sent, and pairs it to an available iME engine 110*a*, 110*b*, . . . , 110*n*, for example, by issuing an iME engine selection control signal 117. If there are multiple messages which could be sent, messages may be selected for processing in accordance with a pre-determined priority as specified, for example, in Bits 0-2 in virtual channel in field 513 specified in the packet header of FIG. 9A. The priority is decided based on the virtual channel. Thus, for example, a system message may be selected first, then a message with high-priority, then a normal priority message is selected. If there are multiple messages that have the highest priority among the candidate messages, a message may be selected randomly, and assigned to the selected iME engine. In every clock cycle, one message can be selected and assigned.

Injection Operation

Returning to FIG. 3A, in operation, as indicated at 201, a processor core 52 writes to the memory system message data 101 that is to be sent via the network. The message data can be large, and can require multiple network packets. The partition of a message into packets, and generation of correct headers for these packets is performed by the MU device 100A.

Then, as indicated at 203, once an imFIFO 99 is updated with the message descriptor, the processor, via the Xbar interface slave 126 in the messaging unit, updates the pointer located in the injection control SRAM (ICSRAM) 130 to point to a new tail (address) of the next descriptor slot 102 in the imFIFO 99. That is, after a new descriptor is written to an empty imFIFO by a processor, e.g., imFIFO 99, software executing on the cores of the same chip writes the descriptor to the location in the memory system pointed to by the tail pointer, and then the tail pointer is incremented for that imFIFO to point to the new tail address for receiving a next descriptor, and the "new tail" pointer address is written to ICSRAM 130 as depicted in FIG. 11 showing ICSRAM contents 575. Subsequently, the MU will recognize the new tail pointer and fetch the new descriptor. The start pointer address 98 in FIG. 5A may be held in ICSRAM along with the size of the buffer. That is, in one embodiment, the end address 97 is NOT stored in ICSRAM. ICSRAM does hold a "size minus 1" value of the imFIFO. MU logic calculates end addresses using the "size minus 1" value. In one embodiment, each descriptor is 64 bytes, for example, and the pointers in ICSRAM are managed in 64-byte units. It is understood that, in view of FIGS. 5D and 5E a new descriptor may be added to a non-empty imFIFO, e.g., imFIFO 99'. The procedure is similar as the case shown in FIG. 5B and FIG. 5C, where, in the non-empty imFIFO depicted, a new message descriptor 104 is being added to the tail address, and the tail pointer is incremented, and the new tail pointer address written to ICSRAM 130.

As shown in the method depicting the processing at the injection side MU, as indicated at 204 in FIG. 4, the injection control FSM 135 waits for indication of receipt of a message descriptor for processing. Upon detecting that a new message descriptor is available in the injection control SRAM 130, the FSM 135 at 205*a* will initiate fetching of the descriptor at the head of the imFIFO. At 205*b*, the MU copies the message descriptor from the imFIFO 99 to the message control SRAM 140 via the Xbar interface master, e.g., port 0. This state machine 135, in one embodiment, also calculates the remaining free space in that imFIFO whenever size, head, or tail pointers are changed, and updates the correct fields in the SRAM. If the available space in that imFIFO crosses an imFIFO threshold, the MU may generate an interrupt, if this interrupt is enabled. That is, when the available space (number of free slots to hold a new descriptors) in an imFIFO exceeds the threshold, the MU raises an interrupt. This threshold is specified by software on the cores via a register in DCR Unit. For example, suppose the threshold is 10, and an imFIFO is filled with the descriptors (i.e., no free slot to store a new descriptor). The MU will process the descriptors. Each time a descriptor has been processed, imFIFO will get one free slot to store a new descriptor. After 11 descriptors have been processed, for example, the imFIFO will have 11 free slots, exceeds the threshold of 10. As a result, MU will raise an interrupt for this imFIFO.

Next, the arbitration logic implemented in the message selection arbiter 145 receives inputs from the message control SRAM 140 and particularly, issues a request to process the available message descriptor, as indicated at 209, FIG. 4. The message selection arbiter 145 additionally receives inputs 115 from the iMEs 110*a*, . . . , 110*n* to apprise the arbiter of the availability of iMEs. The message control SRAM 140 requests of the arbiter 145 an iME to process the available message descriptor. From pending messages and available iMEs, the arbiter logic implemented pairs an iME, e.g., iME 110*b*, and a message at 209.

Figure 12:
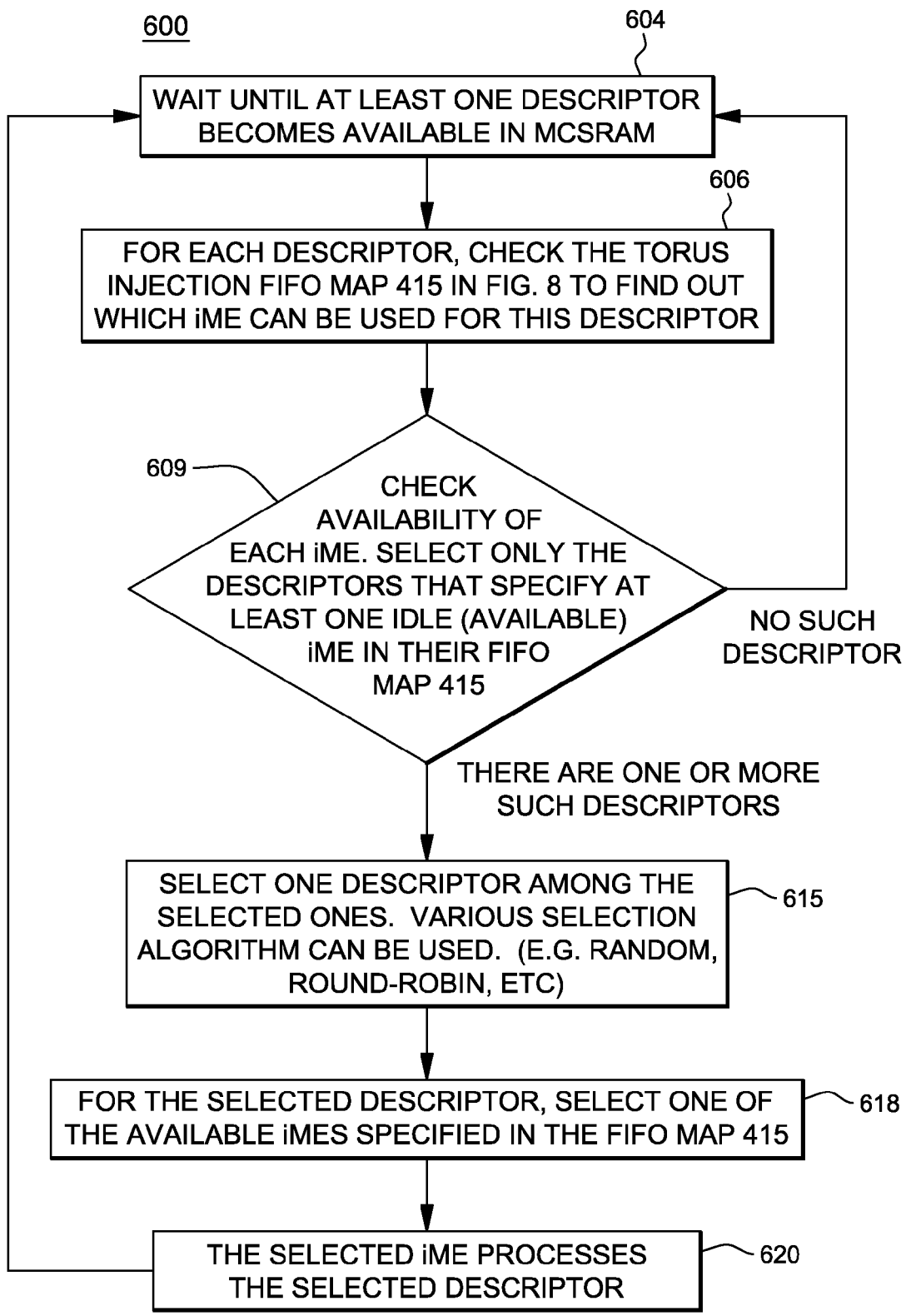
FIG. 12 depicts an algorithm for arbitrating requests for processing packets to be injected by iMEs according to one embodiment.

FIG. 12 depicts a flowchart showing message selection arbiter logic 600 implemented according to an example embodiment. A first step 604 depicts the message selection arbiter 145 waiting until at least one descriptor becomes available in message control SRAM. Then, at 606, for each descriptor, the arbiter checks the Torus Injection FIFO Map field 415 (FIG. 8) to find out which iME can be used for this descriptor. Then, at 609, the arbiter checks availability of each iME and selects only the descriptors that specify at least one idle (available) iME in their FIFO map 415. If there is no descriptor, then the method returns to 604 to wait for a descriptor. Otherwise, at 615, one descriptor is selected from among the selected ones. It is understood that various selection algorithms can be used (e.g., random, round-robin, etc.). Then, at 618, for the selected descriptor, select one of the available iMEs specified in the FIFO map 415. At 620, the selected iME processes the selected descriptor.

In one embodiment, each imFIFO 99 has assigned a priority bit, thus making it possible to assign a high priority to that user FIFO. The arbitration logic assigns available iMEs to the active messages with high priority first (system FIFOs have the highest priority, then user high priority FIFOs, then normal priority user FIFOs). From the message control SRAM 140, the packet header (e.g., 32B), number of bytes, and data address are read out by the selected iME, as indicated at step 210, FIG. 4. On the injection side, one iME can work on a given message at any time. However, multiple iMEs can work in parallel on different messages. Once a message and an iME are matched, only one packet of that message is processed by the iME. An active status bit for that message is set to zero during this time, to exclude this imFIFO from the arbitration process. To submit the next packet to the network, the arbitration steps are repeated. Thus, other messages wanting the same iME (and network injection FIFO) are enabled to be transmitted.

In one embodiment, as the message descriptor contains a bitmap indicating into which network injection FIFOs packets from the message may be injected (Torus injection FIFO map bits 415 shown in FIG. 8), the iME first checks the network injection FIFO status so that it knows not to arbitrate for a packet if its paired network injection FIFO is full. If there is space available in the network injection FIFO, and that message can be paired to that particular iME, the message to inject is assigned to the iME.

Messages from injection memory FIFOs can be assigned to and processed by any iME and its paired network injection FIFO. One of the iMEs is selected for operation on a packet-per-packet basis for each message, and an iME copies a packet from the memory system to a network injection FIFO, when space in the network injection FIFO is available. At step 210, the iME first requests the message control SRAM to read out the header and send it directly to the network injection FIFO paired to the particular iME, e.g., network injection FIFO 180b, in the example provided. Then, as shown at 211, FIGS. 3A and 4, the iME initiates data transfer of the appropriate number of bytes of the message from the memory system to the iME, e.g., iME 110b, via an Xbar interface master. In one aspect, the iME issues read requests to copy the data in 32B, 64B, or 128B at a time. More particularly, as a message may be divided into one or more packets, each iME loads a portion of message corresponding to the packet it is sending. The packet size is determined by "Bit 3-7, Size" in field 525, FIG. 9B. This 5-bit field specifies packet payload size in 32-byte units (e.g. 1=>32B, 2=>64B, ... 16=>512B). The maximum allowed payload size is 512B. For example, the length of a message is 129 bytes, and the specified packet size is 64 bytes. In this case this message is sent using two 64B packets and one 32B packet (only 1B in the 32B payload is used). The first packet sends 1st to 64th bytes of the message, the second one sends $65^{th}$ to $128^{th}$ bytes, and the third one sends $129^{th}$ byte. Therefore, when an iME is assigned to send the second packet, it will request the master port to load $65^{th}$ to $128^{th}$ byte of the message. The iME may load unused bytes and discard them, due to some alignment requirements for accessing the memory system.

Data reads are issued as fast as the Xbar interface master allows. For each read, the iME calculates the new data address. In one embodiment, the iME uses a start address (e.g., specified as address 413 in FIG. 8) and the payload size (525 in FIG. 9B) to decide data address. Specifically, iME reads data block starting from the start address (413) whose size is equal to payload size (525). Each time a packet is processed, the start address (413) is incremented by payload size (525) so that the next iME gets the correct address to read payload data. After the last data read request is issued, the next address points to the first data "chunk" of the next packet. Each iME selects whether to issue a 32B, 64B, or 128B read to the Xbar interface master.

The selection of read request size is performed as follows: In the following examples, a "chunk" refers to a 32B block that starts from 32B-aligned address. Thus, for example, for a read request of 128B, the iME requests 128B block starting from address 128N (N: integer), when it needs at least the 2nd and 3rd chunks in the 128B block (i.e., It needs at least 2 consecutive chunks starting from address 128N+32. This also includes the cases that it needs first 3 chunks, last 3 chunks, or all the 4 chunks in the 128B block, for example.) For a read request of 64B, the iME requests 64B block starting from address 64N, e.g., when it needs both chunks included in the 64B block. For read request of 32B: the iME requests 32B block. For example, when the iME is to read 8 data chunks from addresses 32 to 271, it generates requests as follows:

1. iME requests 128B starting from address 0, and uses only the last 96B;
2. iME requests 128B starting from address 128, and uses all 128B;
3. iME requests 32B starting from address 256.

It is understood that read data can arrive out of order, but returns via the Xbar interface master that issued the read, e.g., the read data will be returned to the same master port requesting the read. However, the order between read data return may be different from the request order. For example, suppose a master port requested to read address 1, and then requested to read address 2. In this case the read data for address 2 can arrive earlier than that for address 1.

iMEs are mapped to use one of the three Xbar interface masters in one implementation. When data arrives at the Xbar interface master, the iME which initiated that read request updates its byte counter of data received, and also generates the correct address bits (write pointer) for the paired network injection FIFO, e.g., network injection FIFO 180b. Once all data initiated by that iME are received and stored to the paired network injection FIFO, the iME informs the network injection FIFO that the packet is ready in the FIFO, as indicated at 212. The message control SRAM 140 updates several fields in the packet header each time it is read by an iME. It updates the byte count of the message (how many bytes from that message are left to be sent) and the new data offset for the next packet.

Thus, as further shown in FIG. 4, at step 215, a decision is made by the iME control logic whether the whole message has been injected. If the whole message has not been sent, then the process resumes at step 209 where the arbiter logic implemented pairs an iME to send the next one packet for the message descriptor being processed, and steps 210-215 are repeated, until such time the whole message is sent. The arbitration step is repeated for each packet.

Each time an iME 110 starts injecting a new packet, the message descriptor information at the message control SRAM is updated. Once all packets from a message have been sent, the iME removes its entry from the message control SRAM (MCSRAM), advances its head pointer in the injection control SRAM 130. Particularly, once the whole message is sent, as indicated at 219, the iME accesses the injection control SRAM 130 to increment the head pointer, which then triggers a recalculation of the free space in the imFIFO 99. That is, as the pointers to injection memory FIFOs work from the head address, thus, when the message is finished, the head pointer is updated to the next slot in the FIFO. When the FIFO end address is reached, the head pointer will wrap around to the FIFO start address. If the updated head address pointer is not equal to the tail of the injection memory FIFO then there is a further message descriptor in that FIFO that could be processed, i.e., the imFIFO is not empty and one or more message descriptors remain to be fetched. Then, the ICS- RAM will request the next descriptor read via the Xbar interface master, and the process returns to 204. Otherwise, if the head pointer is equal to the tail, the FIFO is empty.

As mentioned, the injection side 100A of the Messaging Unit supports any byte alignment for data reads. The correct data alignment is performed when data are read out of the network reception FIFOs, i.e., alignment logic for injection MU is located in the network device. The packet size will be the value specified in the descriptor, except for the last packet of a message. MU adjusts the size of the last packet of a message to the smallest size to hold the remaining part of the message data. For example, when user injects a 1025B message descriptor whose packet size is 16 chunks=512B, the MU will send this message using two 512B packets and one 32B packet. The 32B packet is the last packet and only 1B in the 32B payload is valid.

As additional examples: for a 10B message with a specified packet size=16 (512B), the MU will send one 32B packet, only 10B in the 32B data is valid. For a 0B message with a specified packet size=anything, the MU will send one 0B packet. For a 260B message with a specified packet size=8 (256B), the MU will send one 256B packet and one 32B packet. Only 4B in the last 32B packet data are valid.

In operation, the iMEs/rMEs further decide priority for payload read/write from/to the memory system based on the virtual channel (VC) of the message. Certain system VCs (e.g., "system" and "system collective") will receive the highest priority. Other VCs (e.g., high priority and usercommworld) will receive the next highest priority. Other VCs will receive the lower priority. Software executing at the processors sets a VC correctly to get desired priority.

Figure 6:
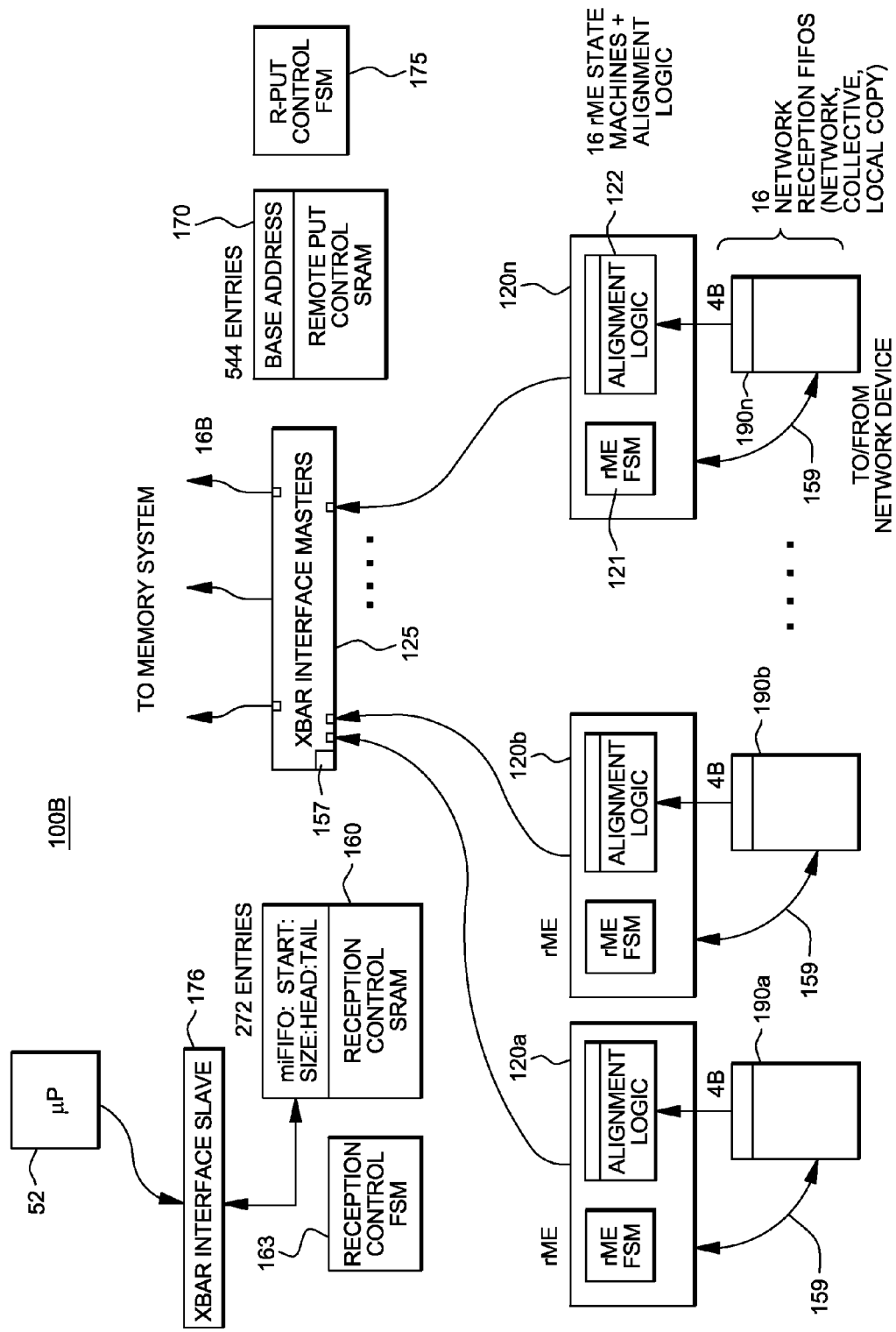
FIG. 6 is a high level schematic of the Messaging Unit for the reception side according to one embodiment.

It is further understood that each iME can be selectively enabled or disabled using a DCR register. An iME 110 is enabled when the corresponding DCR (control signal), e.g., bit, is set to 1, and disabled when the DCR bit is set to 0, for example. If this DCR bit is 0, the iME will stay in the idle state until the bit is changed to 1. If this bit is cleared while the corresponding iME is processing a packet, the iME will continue to operate until it finishes processing the current packet. Then it will return to the idle state until the enable bit is set again. When an iME is disabled, messages are not processed by it. Therefore, if a message specifies only this iME in the FIFO map, this message will not be processed and the imFIFO will be blocked until the iME is enabled again. Further details of DCR control operation in the context of obtaining system checkpoints, is described in greater detail in commonly-owned, co-pending U.S. patent Ser. No. 8,359,367, the whole contents of which is incorporated by reference as if fully set forth herein, Reception FIG. 6 depicts a high level diagram of the MU reception side 100B for handling the packet reception in the MU 100. Reception operation includes receiving packets from the network and writing them into the memory system. Packets are received at network reception FIFOs 190a, 190b, ..., 190n. In one embodiment, the network reception FIFOs are associated with torus network, collective, and local copy operations. In one implementation, n=16, however, other implementations are possible. The memory system includes a set of reception memory FIFOs (rmFIFOs), such as rmFIFO 199 shown in FIG. 6A, which are circular buffers used for storing packets received from the network. In one embodiment, there are sixteen (16) rmFIFOs assigned to each processor core, however, other implementations are possible.

As shown in FIG. 6, reception side MU device 100B includes multiple rMEs (reception messaging engine units) 120a, 120b, ..., 120n. In one embodiment, n=16, however, other implementations are possible. Generally, at the MU reception side 100B, there is an rME for each network reception FIFO. Each of the rMEs contains a DMA reception control state machine 121, byte alignment logic 122, and control/status registers (not shown). In the rMEs 120a, 120b, ..., 120n, the DMA reception control state machine 121 detects that a paired network reception FIFO is non-empty, and if it is idle, it obtains the packet header, initiates reads to an SRAM, controls data transfer to the memory system, including an update of counter data located in the memory system, and it generates an interrupt, if selected. The Byte alignment logic 122 ensures that the data to be written to the memory system are aligned, in one embodiment, on a 32B boundary for memory FIFO packets, or on any byte alignment specified, e.g., for put packets.

In one embodiment, storing of data to Xbar interface master is via 16-byte unit and must be 16-byte aligned. The requestor rME can mask some bytes, i.e., it can specify which bytes in the 16-byte data are actually stored. The role of alignment logic is to place received data in the appropriate position in a 16-byte data line. For example: an rME needs to write 20-byte received data to memory system address 35 to 54. In this case 2 write requests are necessary: 1) The alignment logic builds the first 16-byte write data. The $1^{st}$ to $13^{th}$ received bytes are placed in byte 3 to 15 in the first 16-byte data. Then the rME tells the Xbar interface master to store the 16-byte data to address 32, but not to store the byte 0, 1, and 2 in the 16-byte data. As a result, byte 3 to 15 in the 16-byte data (i.e. $1^{st}$ to $13^{th}$ received bytes) will be written to address 35 to 47 correctly. Then the alignment logic builds the second 16-byte write data. The $14^{th}$ to $20^{th}$ received bytes are placed in byte 0 to 6 in the second 16-byte data. Then the rME tell the Xbar interface master to store the 16-byte data to address 48, but not to store byte 7 to 15 in the 16-byte data. As a result, the $14^{th}$ to $20^{th}$ received bytes will be written to address 48 to 54 correctly.

Although not shown, control registers and SRAMs are provided that store part of control information when needed for packet reception. These status registers and SRAMs may include, but are not limited to, the following registers and SRAMs: Reception control SRAM (Memory mapped); Status registers (Memory mapped); and remote put control SRAM (Memory mapped).

In operation, when one of the network reception FIFOs receives a packet, the network device generates a signal 159 for receipt at the paired rME 120 to inform the paired rME that a packet is available. In one aspect, the rME reads the packet header from the network reception FIFO, and parses the header to identify the type of the packet received. There are three different types of packets: memory FIFO packets, direct put packets, and remote get packets. The type of packet is specified by bits in the packet header, as described below, and determines how the packets are processed.

In one aspect, for direct put packets, data from direct put packets processed by the reception side MU device 100B are put in specified locations in memory system. Information is provided in the packet to inform the rME of where in memory system the packet data is to be written. Upon receiving a remote get packet, the MU device 100B initiates sending of data from the receiving node to some other node.

Other elements of the reception side MU device 100B include the Xbar interface slave 126 for management. It accepts write and read requests from a processor and updates SRAM values such as reception control SRAM (RCSRAM) 160 or remote put control SRAM (R-put SRAM) 170 values. Further, the Xbar interface slave 126 reads SRAM and returns read data to the Xbar. In one embodiment, Xbar interface slave 126 processes all requests in-order of arrival. More particularly, the Xbar interface master 125 generates a connection to the Xbar 60 to write data to the memory system. Xbar interface master 125 also includes an arbiter unit 157 for arbitrating between multiple rMEs (reception messaging engine units) 120a, 120b, . . . 120n to access the Xbar interface master. In one aspect, as multiple rMEs compete for a Xbar interface master to store data, the Xbar interface master decides which rME to select. Various algorithm can be used for selecting an rME. In one embodiment, the Xbar interface master selects an rME based on the priority. The priority is decided based on the virtual channel of the packet the rME is receiving. (e.g., "system" and "system collective" have the highest priority, "high priority" and "usercommworld" have the next highest priority, and the others have the lowest priority). If there are multiple rMEs that have the same priority, one of them may be selected randomly.

As in the MU injection side of FIG. 3, the MU reception side also uses the three Xbar interface masters. In one embodiment, a cluster of five or six rMEs may be paired to a single Xbar interface master (there can be two or more clusters of five or six rMEs). In this embodiment, at most one rME per Xbar interface master may write on any given cycle for up to three simultaneous write operations. Note that more than three rMEs can be active processing packets at the same time, but on any given cycle only three can be writing to the switch.

The reception control SRAM 160 is written to include pointers (start, size, head and tail) for rmFIFOs, and further, is mapped in the processor's memory address space. The start pointer points to the FIFO start address. The size defines the FIFO end address (i.e. FIFO end=start+size). The head pointer points to the first valid data in the FIFO, and the tail pointer points to the location just after the last valid data in the FIFO. The tail pointer is incremented as new data is appended to the FIFO, and the head pointer is incremented as new data is consumed from the FIFO. The head and tail pointers need to be wrapped around to the FIFO start address when they reach the FIFO end address. A reception control state machine 163 arbitrates access to reception control SRAM (RCSRAM) between multiple rMEs and processor requests, and it updates reception memory FIFO pointers stored at the RCSRAM. As will be described in further detail below, R-Put SRAM 170 includes control information for put packets (base address for data, or for a counter). This R-Put SRAM is mapped in the memory address space. R-Put control FSM 175 arbitrates access to R-put SRAM between multiple rMEs and processor requests. In one embodiment, the arbiter mechanism employed alternately grants an rME and the processor an access to the R-put SRAM. If there are multiple rMEs requesting for access, the arbiter selects one of them randomly. There is no priority difference among rMEs for this arbitration.

Figure 7:
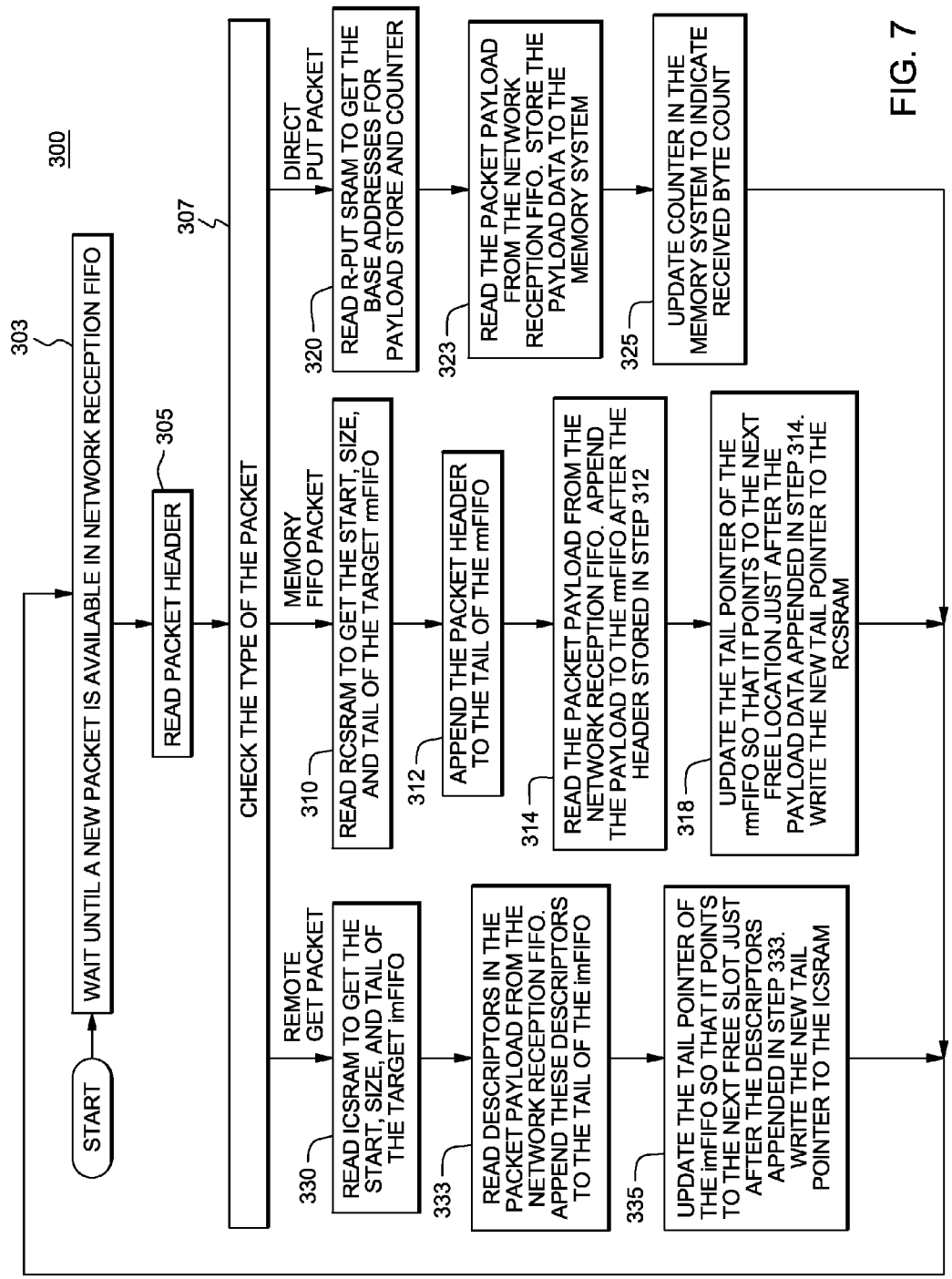
FIG. 7 depicts a methodology 300 for describing the operation of an rME 120a, 120b, . . . 120n for packet reception according to one embodiment.

FIG. 7 depicts a methodology 300 for describing the operation of an rME 120a, 120b, . . . 120n. As shown in FIG. 7, at 303, the rME is idle waiting for reception of a new packet in a network reception FIFO 190a, 190b, . . . ,190n. Then, at 305, having received a packet, the header is read and parsed by the respective rME to determine where the packet is to be stored. At 307, the type of packet is determined so subsequent packet processing can proceed accordingly. Thus, for example, in the case of memory FIFO packets, processing proceeds at the rME at step 310 et seq.; in the case of direct put packets, processing proceeds at the rME at step 320 et seq.; and, for the case of remote get packets, processing proceeds at the rME at step 330 et seq.

Figure 6A:
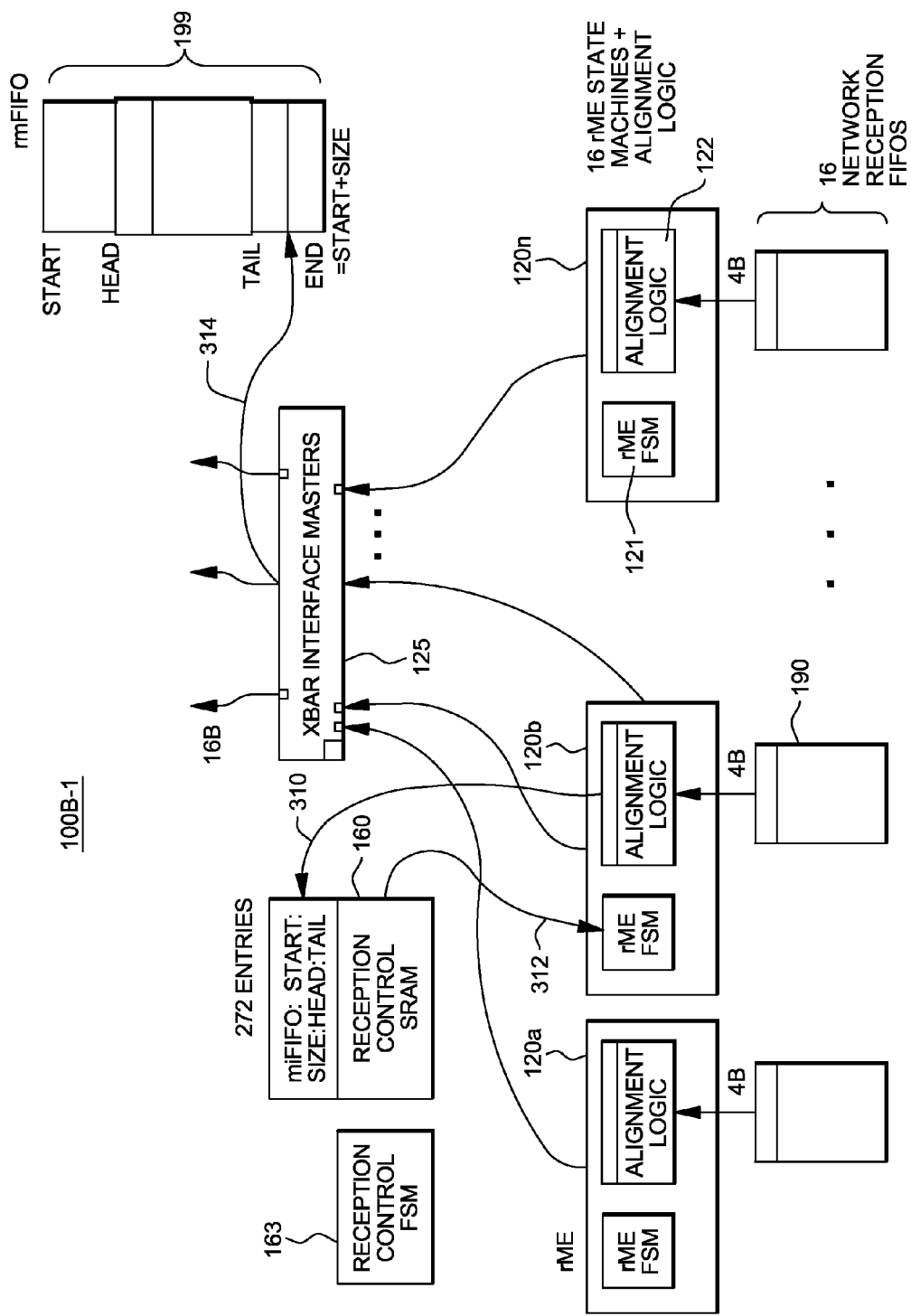
FIG. 6A depicts operation of the MU device 100B-1 for processing received memory FIFO packets according to one embodiment.

In the case of memory FIFO packet processing, in one embodiment, memory FIFO packets include a reception memory FIFO ID field in the packet header that specifies the destination rmFIFO in memory system. The rME of the MU device 100B parses the received packet header to obtain the location of the destination rmFIFO. As shown in FIG. 6A depicting operation of the MU device 100B-1 for processing received memory FIFO packets, these memory FIFO packets are to be copied into the rmFIFOs 199 identified by the memory FIFO ID. Messages processed by an rME can be moved to any rmFIFO. Particularly, as shown in FIG. 6A and FIG. 7 at step 310, the rME initiates a read of the reception control SRAM 160 for that identified memory FIFO ID, and, based on that ID, a pointer to the tail of the corresponding rmFIFO in memory system (rmFIFO tail) is read from the reception control SRAM at 310. Then, the rME writes the received packet, via one of the Xbar interface masters 125, to the rmFIFO, e.g., in 16B write chunks. In one embodiment, the rME moves both the received packet header and the payload into the memory system location starting at the tail pointer. For example, as shown at 312, the packet header of the received memory FIFO packet is written, via the Xbar interface master, to the location after the tail in the rmFIFO 199 and, at 314, the packet payload is read and stored in the rmFIFO after the header. Upon completing the copy of the packet to the memory system, the rME updates the tail pointer and can optionally raise an interrupt, if the interrupt is enabled for that rmFIFO and an interrupt bit in the packet header is set. In one embodiment, the tail is updated for number of bytes in the packets atomically. That is, as shown at 318, the tail pointer of the rmFIFO is increased to include the new packet, and the new tail pointer is written to the RCSRAM 160. When the tail pointer reaches the end of FIFO as a result of the increment, it will be wrapped around to the FIFO start. Thus, for memory FIFO packets, the rmFIFOs can be thought of as a simple producer-consumer queue: rMEs are the producers who move packets from network reception FIFOs into the memory system, and the processor cores are the consumers who use them. The consumer (processor core) advances a header pointer, and the producer (rME) advances a tail pointer.

In one embodiment, as described in greater detail in co-pending U.S. patent Ser. No. 8,086,766 , to allow simultaneous usage of the same rmFIFO by multiple rMEs, each rmFIFO has advance tail, committed tail, and two counters for advance tail ID and committed tail ID. The rME copies packets to the memory system location starting at the advance tail, and gets advance tail ID. After the packet is copied to the memory system, the rME checks the committed tail ID to determine if all previously received data for that rmFIFO are copied. If this is the case, the rME updates committed tail, and committed tail ID, otherwise it waits. An rME implements logic to ensure that all store requests for header and payload have been accepted by the Xbar before updating committed tail (and optionally issuing interrupt).

Figure 6B:
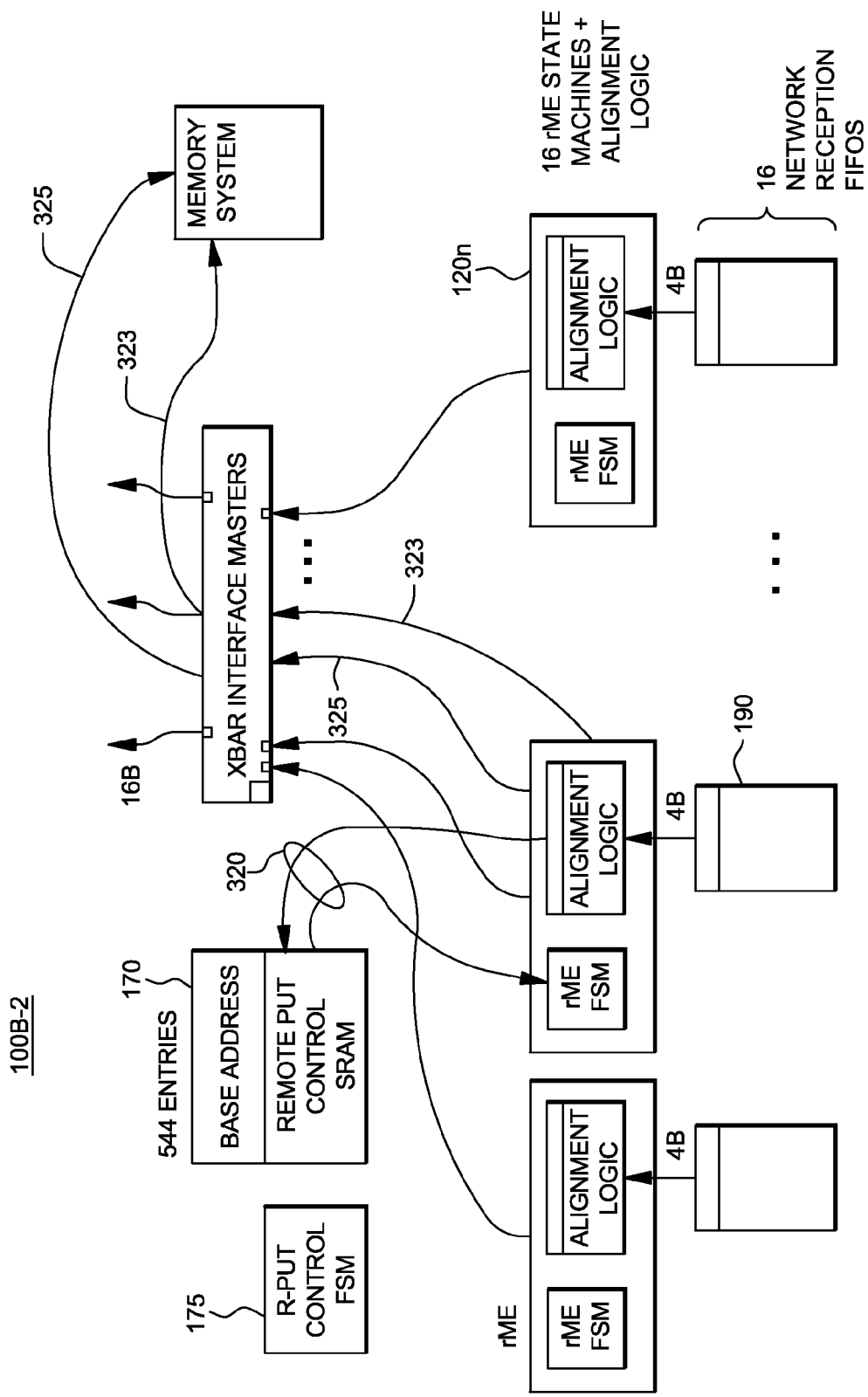
FIG. 6B depicts operation of the MU device 100B-2 for processing received direct put packets according to one embodiment.

In the case of direct put packet processing, in one embodiment, the MU device 100B further initiates putting data in specified location in the memory system. Direct put packets include in their headers a data ID field and a counter ID field—both used to index the R-put SRAM 170; however, the header includes other information such as, for example, a number of valid bytes, a data offset value, and counter offset value. The rME of the MU device 100B parses the header of the received direct put packet to obtain the data ID field and a counter ID field values. Particularly, as shown in FIG. 6B depicting operation of the MU device 100B-2 for processing received direct put packets and, the method of FIG. 7 at step 320, the rME initiates a read of the R-put SRAM 170 and, based on data ID field and a counter ID field values, indexes and reads out a respective data base address and a counter base address. Thus, for example, a data base address is read from the R-put SRAM 170, in one embodiment, and the rME calculates an address in the memory system where the packet data is to be stored. In one embodiment, the address for packet storage is calculated according to the following:

Base address+data offset=address for the packet

In one embodiment, the data offset is stored in the packet header field "Put Offset" 541 as shown in FIG. 10. This is done on the injection side at the sender node. The offset value for the first packet is specified in the header field "Put Offset" 541 in the descriptor. MU automatically updates this offset value during injection. For example, suppose offset value 10000 is specified in a message descriptor, and three 512-byte packets are sent for this message. The first packet header will have offset=10000, and the next packet header will have offset=10512, and the last packet header will have offset=11024. In this way each packet is given a correct displacement from the starting address of the message. Thus each packet is stored to the correct location.

Likewise, a counter base address is read from the R-put SRAM 170, in one embodiment, and the rME calculates another address in the memory system where a counter is located. The value of the counter is to be updated by the rME. In one embodiment, the address for counter storage is calculated according to the following:

Base address+counter offset=address for the counter

In one embodiment, the counter offset value is stored in header field "Counter Offset" 542, FIG. 10. This value is directly copied from the packet header field in the descriptor at the sender node. Unlike the data offset, all the packets from the same message will have the same counter offset. This means all the packets will correctly access the same counter address.

In one embodiment, the rME moves the packet payload from a network reception FIFO 190 into the memory system location calculated for the packet. For example, as shown at 323, the rME reads the packet payload and, via the Xbar interface master, writes the payload contents to the memory system specified at the calculated address, e.g., in 16B chunks or other byte sizes. Additionally, as shown at 325, the rME atomically updates a byte counter in the memory system.

Figure 13:
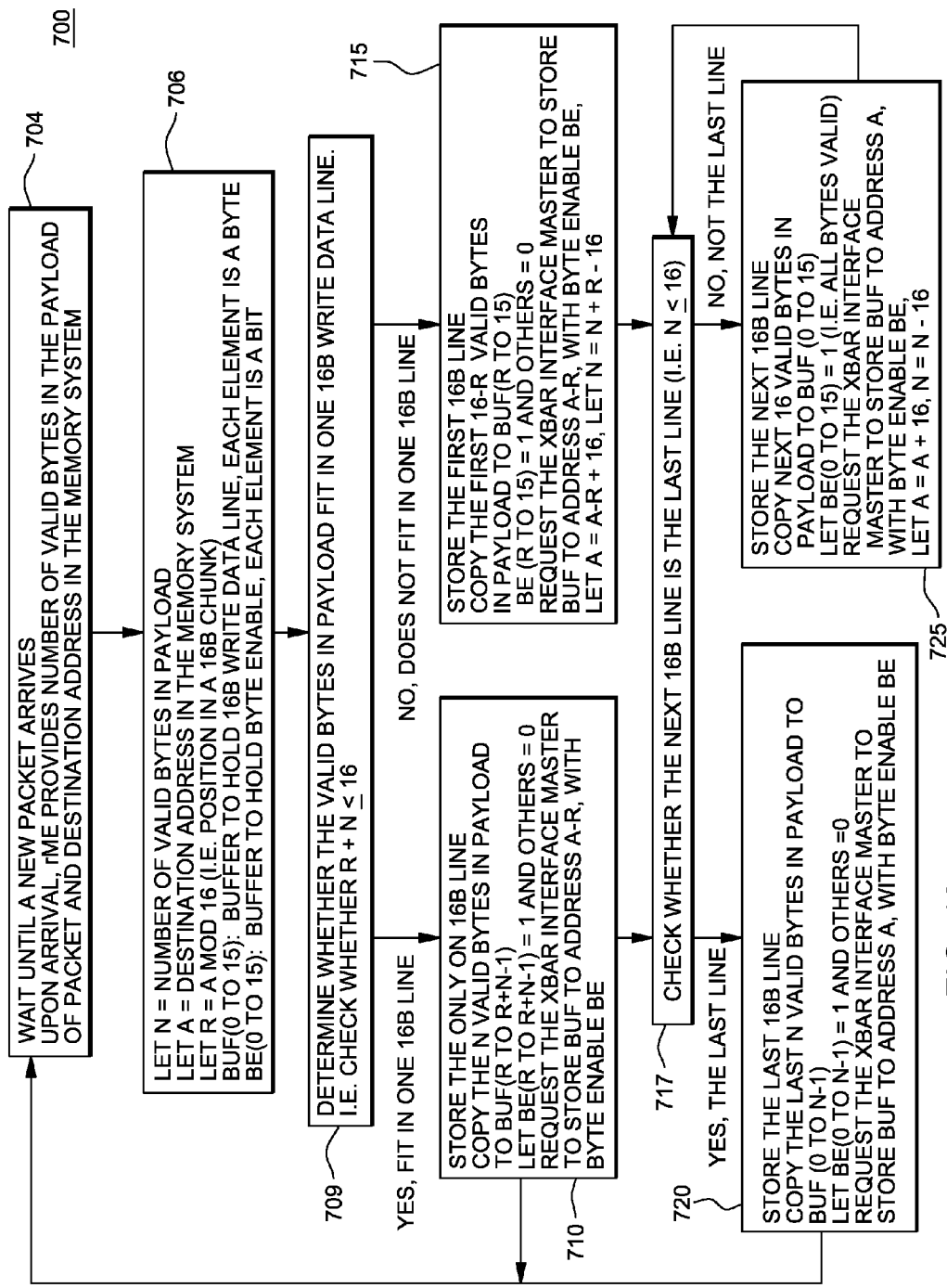
FIG. 13 depicts a flowchart showing implementation of byte alignment according to one embodiment.

The alignment logic implemented at each rME supports any alignment of data for direct put packets. FIG. 13 depicts a flow chart of a method for performing data alignment for put packets. The alignment logic is necessary because of processing restrictions when rME stores data via Xbar interface master: 1) rME can store data in 16-byte unit and the destination is to be 16-byte aligned; 2) If rME wants to write a subset of a 16-byte chunk, it needs to set Byte Enable (BE) signals correctly. There are 16 bits of byte enable signals to control whether each byte in a 16-byte write data line is stored to the memory system. When rME wants to store all 16 bytes, it needs to assert all the 16 byte enable (BE) bits. Because of this, rME needs to place each received byte at a particular position in a 16-byte line. Thus, in one embodiment, a write data bus provides multiple bytes, and byte enable signals control which bytes on the bus are actually written to the memory system.

As shown in FIG. 13 depicting a flowchart showing byte alignment method 700 according to an example embodiment, a first step 704 includes an rME waiting for a new packet to be received and, upon arrival, rME provides number of valid bytes in the payload and destination address in the memory system. Then, the following variables are initialized including: N=number of valid bytes, A=destination address, and, R=A mod 16 (i.e. position in a 16B chunk), BUF(0 to 15): buffer to hold 16B write data line, each element is a byte, and BE(0 to 15): buffer to hold byte enable, (each element is a bit). Then, at 709, a determination is made as to whether the whole payload data fits in one 16B write data line, e.g., by performing a check of whether R+N≦16. If determined that the payload data could fit, then the process proceeds to 710 where the rME performs storing the one 16B line; and, copying the N bytes payload data to BUF(R to R+N−1). Letting (Byte Enable) BE(R to R+N−1)=1 and others=0, the rME requests the Xbar interface master to store BUF to address A−R, with byte enable BE. Then the process returns to step 704 to wait for the next packet. Otherwise, if it is determined at step 709 that the payload data could not fit in one 16B write data line, then the process proceeds to 715 to perform storing the first 16B line and copying a first 16-R payload bytes to BUF (R to 15) and letting BE (R to 15)=1 and others=0. Then, the rME requests Xbar interface master to store BUF to address A−R, with byte enable BE and letting A=A−R+16, and N=N+R−16. Then the process proceeds to step 717 where a check is made to determine whether the next 16B line is the last line (i.e., N≦16). If at 717, it is determined that the next 16B line is the last line, then the rME performs storing the last 16B line and copying the last N bytes to BUF (0 to N−1); and letting BE(0 to N−1)=1 and others=0 prior to requesting Xbar interface master to store BUF to address A, with byte enable BE. Then the process returns to step 704 to wait for the next packet arrived. Otherwise, if it is determined at step 717 that the next 16B line is not the last line, then the process proceeds to 725 where the rME performs: storing the next 16B line and copying the next 16 payload bytes to BUF (0 to 15) and letting BE(0 to 15)=1 (i.e. all bytes valid) before requesting the Xbar interface master to store BUF to address A, with byte enable BE, Let A=A+16, N=N−16. The process then returns to 717 to make the check of whether the remaining data of the received packet payload does fit in the last line and perform the processing of 725 if the last line is not being written. Only until the last line of the received packet payload is written to 16B line are steps 717 and 725 repeated.

Figure 14A:
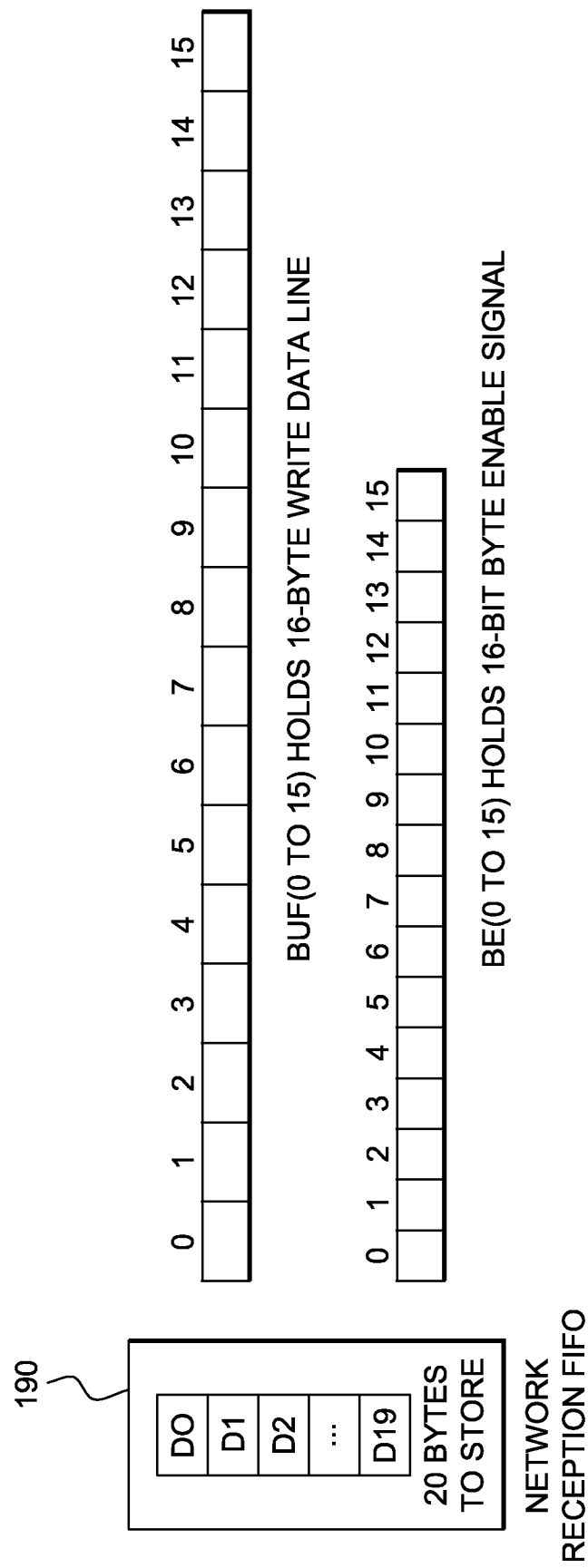

Utilizing notation in FIG. 13, a packet payload storage alignment example is provided with respect to FIG. 14A-14E. As shown in FIG. 14A, twenty (20) bytes of valid payload at network reception FIFO 190 are to be stored by the rME device to address 30. A goal is thus to store bytes D0, . . . , D19 to address 30, . . . ,49. The rME logic implemented thus initializes variables N=number of valid bytes=20, A=destination address=30 and R=A mod 16=14. Given these values, it is judged whether the data can fit in one 16B line, i.e., is R+N≦16. As the valid bytes will not fit in one line, the first 16B line is stored by copying the first 16−R=2 bytes (i.e. D0, D1) to BUF (R to 15), i.e., BUF (14 to 15) then assigning BE (14 to 15)=1 and others=0 as depicted in FIG. 14B.

Then, the rME requests the Xbar interface master to store BUF to address A−R=16 (16B-aligned) resulting in byte enable (BE)=0000000000000011. As a result, D0 and D1 is stored to correct address 30 and 31 and the variables are re-calculated as: A=A−R+16=32, N=N+R−16=18. Then, a further check is performed to determine if the next 16B line is the last N≦16 and in this example, the determination would be that the next line is not the last line. Thus, the next line is stored, e.g., by copying the next 16 bytes (D2, . . . , D17) to BUF(0 to 15) and letting BE(0 to 15)=1 as depicted in FIG. 14C. Then, the rME requests the Xbar interface master to store BUF to address 32, and byte enable (BE)=1111111111111111. As a result, D2, . . . , D17 are stored to correct address 32 to 47, and the variables are re-calculated as: A=A+16=48, N=N−16=2 resulting in N=2, A=48 and R=14. Then, continuing, a determination is made as to whether the next 16B line is the last, i.e., N≦16?. In this example, the next line is the last line. Thus, the rME initiates storing the last line and copying the last N=2 bytes (i.e. D18, D19) to BUF (0 to N−1) i.e. BUF (0 to 1) then letting BE(0 to 1)=1 and others=0 as depicted in FIG. 14D. Then, the rME requests the Xbar interface master to store BUF to address A=48 resulting in byte enable (BE)=1100000000000000. Thus, as a result, payload bytes D18 and D19 are stored to address 48 and 49. Now all valid data D0, . . . , D19 have been correctly stored to address 30 . . . 49.

Furthermore, an error correcting code (ECC) capability is provided and an ECC is calculated for each 16B data sent to the Xbar interface master and on byte enables.

In a further aspect of direct put packets, multiple rMEs can receive and process packets belonging to the same message in parallel. Multiple rMEs can also receive and process packets belonging to different messages in parallel.

Further, it is understood that a processor core at the compute node has previously performed operations including: the writing of data into the remote put control SRAM 170; and, a polling of the specified byte counter in the memory system until it is updated to a value that indicates message completion.

In the case of remote get packet processing, in one embodiment, the MU device 100B receives remote get packets that include, in their headers, an injection memory FIFO ID. The imFIFO ID is used to index the ICSRAM 130. As shown in the MU reception side 100B-3 of FIG. 6C and the flow method of FIG. 7, at 330 the imFIFO ID indexes ICSRAM to read a tail pointer (address) to the corresponding imFIFO location. This tail pointer is the destination address for that packet. Payload of remote get packet includes one or more descriptors, and these descriptors are appended to the imFIFO by the MU. Then the appended descriptors are processed by the MU injection side. In operation, if multiple reception rMEs try to access the same imFIFO simultaneously, the MU detects conflict between rMEs. Each rME informs the ICSRAM which imFIFO (if any) it is working on. Based on this information, ICSRAM rejects rMEs requesting an imFIFO on which another rME is working.

Further, at 333, via the Xbar interface master, the rME writes descriptors from the packet payload to the memory system location in the imFIFO pointed to by the corresponding tail pointer read from the ICSRAM. In one example, payload data at the network reception FIFO 190 is written in 16B chunks or other byte denominations. Then, at 335, the rME updates the imFIFO tail pointer in the injection control SRAM 130 so that the imFIFO includes the stored descriptors. The Byte alignment logic 122 implemented at the rME ensures that the data to be written to the memory system are aligned, in one embodiment, on a 32B boundary for memory FIFO packets. Further in one embodiment, error correction code is calculated for each 16B data sent to the Xbar and on byte enables.

Each rME can be selectively enabled or disabled using a DCR register. For example, an rME is enabled when the corresponding DCR bit is 1 at the DCR register, and disabled when it is 0. If this DCR bit is 0, the rME will stay in the idle state or another wait state until the bit is changed to 1. The software executing on a processor at the node sets a DCR bit. The DCR bits are physically connected to the rMEs via a "backdoor" access mechanism (not shown). Thus, the register value propagates to rME immediately when it is updated.

If this DCR bit is cleared while the corresponding rME is processing a packet, the rME will continue to operate until it reaches either the idle state or a wait state. Then it will stay in the idle or wait state until the enable bit is set again. When an rME is disabled, even if there are some available packets in the network reception FIFO, the rME will not receive packets from the network reception FIFO. Therefore, all messages received by the network reception FIFO will be blocked until the corresponding rME is enabled again.

When an rME can not store a received packet because the target imFIFO or rmFIFO is full, the rME will poll the FIFO until it has enough free space. More particularly, the rME accesses ICSRAM and when it finds the imFIFO is full, ICSRAM communicates to rME that it is full and can't accept the request. Then rME waits for a while to access the ICSRAM again. This process is repeated until the imFIFO becomes not-full and the rME's request is accepted by ICSRAM. The process is similar when rME accesses reception control SRAM but the rmFIFO is full.

In one aspect, a DCR interrupt will be issued to report the FIFO full condition to the processors on the chip. Upon receiving this interrupt, the software takes action to make free space for the imFIFO/rmFIFO. (e.g. increasing size, draining packets from rmFIFO, etc.). Software running on the processor on the chip manages the FIFO and makes enough space so that the rME can store the pending packet. Software can freeze rMEs by writing DCR bits to enable/disable rMEs so that it can safely update FIFO pointers.

Packet Header and Routing

In one embodiment, a packet size may range from 32 to 544 bytes, in increments of 32 bytes. In one example, the first 32 bytes constitute a packet header for an example network packet. The packet header 500 includes a first network header portion 501 (e.g., 12 bytes) as shown in the example network header packet depicted as shown in FIG. 9A or a second network header portion 501' as shown in the example network header packet depicted as shown in FIG. 9B. This header portion may be followed by a message unit header 502 (e.g., 20 bytes) as shown in FIG. 9. The header is then followed by 0 to 16 payload "chunks", where each chunk contains 32B (bytes) for example. There are two types of network headers: point-to-point and collective. Many of the fields in these two headers are common as will be described herein below.

The first network header portion 501 as shown in FIG. 9A, depicts a first field 510 identifying the type of packet (e.g., point-to-point and collective packet) which is normally a value set by the software executing at a node. A second field 511 provides a series of hint bits, e.g., 8 bits, with 1 bit representing a particular direction in which the packet is to be routed (2 bits/dimension), e.g., directions A−,A+,B−,B+,C−, C+,D−, D+ for a 4-D torus. The next field 512 includes two further hint bits identifying the "E" dimension for packet routing in a 5-D Torus implementation. Packet header field 512 further includes a bit indicating whether an interrupt bit has been set by the message unit, depending on a bit in the descriptor. In one embodiment, this bit is set for the last packet of a message (otherwise, it is set to 0, for example). Other bits indicated in Packet header field 512 may include: a route to I/O node bit, return from I/O node, a "use torus" port bit(s), use I/O port bit(s), a dynamic bit, and, a deposit bit.

A further field 513 includes class routes must be defined so that the packet could travel along appropriate links. For example, bits indicated in Packet header field 513 may include: virtual channel bit (e.g., which bit may have a value to indicate one of the following classes: dynamic, deterministic (escape); high priority; system; user commworld; sub-commincator, or, system collective); zone routing id bit(s); and, "stay on bubble" bit.

A further field 514 includes destination addresses associated with the particular dimension A-E, for example. A further field 515 includes a value indicating the number (e.g., 0 to 16) of 32 byte data payload chunks added to header, i.e., payload sizes, for each of the memory FIFO packets, put, get or paced-get packets. Other packet header fields indicated as header field 516 include data bits to indicate the packet alignment (set by MU), a number of valid bytes in payload (e.g., the MU informs the network which is the valid data of those bytes, as set by MU), and, a number of 4B words, for example, that indicate amount of words to skip for injection checksum (set by software). That is, while message payload requests can be issued for 32B, 64B and 128B chunks, data comes back as 32B units via the Xbar interface master, and a message may start at a middle of one of those 32B units. The iME keeps track of this and writes, in the packet header, the alignment that is off-set within the first 32B chunk at which the message starts. Thus, this offset will indicate the portion of the chunk that is to be ignored, and the network device will only parse out the useful portion of the chunk for processing. In this manner, the logic implemented at the network logic can figure out which bytes out of the 32B are the correct ones for the new message. The MU knows how long the packet is (message size or length), and from the alignment and the valid bytes, instructs the Network Interface Unit where to start and end the data injection, i.e., from the 32Byte payload chunk being transferred to network device for injection. For data reads, the alignment logic located in the network device supports any byte alignment.

As shown in FIG. 9B, a network header portion 501' depicts a first field 520 identifying a collective packet, which is normally a value set by the software executing at a node. A second field 521 provides a series of bits including the collective Opcode indicating the collective operation to be performed. Such collective operations include, for example: and, or, xor, unsigned add, unsigned min, unsigned max, signed add, signed min, signed max, floating point add, floating point minimum, and floating point maximum. It is understood that, in one embodiment, a word length is 8 bytes for floating point operations. A collective word length, in one embodiment, is computed according to $B=4*2^n$ bytes where n is the collective word length exponent. Thus additional bits indicate the collective word length exponent. For example, for floating point operations n=1 (B=8). In one embodiment, the Opcode and word length are ignored for broadcast operation. The next field 522 includes further bits including an interrupt bit that set by the message unit, depending on a bit in the descriptor. It is only set for the last packet of a message (else 0). Packet header field 523 further indicates class routes defined so that the packet could travel along appropriate links. These class routes specified, include, for example, virtual channel (VC) (having values indicating dynamic, deterministic (escape), high priority, system, user commworld, user subcommunicator, and, system collective. Further bits indicate collective type routes including (broadcast, reduce, all-reduce, and reserved/possible point-point over collective route). As in the network packet header a field 524 includes destination addresses associated with the particular dimension A-E, for example, in a 5-D torus network configuration. In one embodiment, for collective operations, a destination address is used for reduction. A further payload size field 525 includes a value indicating the number of 32 byte chunks added to header, e.g., payload sizes range from 0B to 512B (32B*16), for example, for each of the memory FIFO packets, put, get or paced-get packets. Another packet header fields indicated as header field 526 include data bits to indicate the packet alignment (set by MU), a number of valid bytes in payload (e.g., 0 means 512, as set by MU), and, a number of 4 byte words, for example, that indicate amount of words to skip for injection checksum (set by software).

The payload size field specifies number of 32 bytes chunks. Thus payload size is 0B to 512B (32B*16)

Remaining bytes of the each network packet or collective packet header of FIGS. 9A, 9B are depicted in FIG. 10 for each of the memory FIFO, direct put and remote get packets. For the memory FIFO packet header 530, there is provided a reception memory FIFO ID processed by the MU 100B-1 as described herein in connection with FIG. 6A. In addition to rmFIFO ID, there is specified the Put Offset value. The Initial value of Put Offset is specified, in one embodiment, by software and updated for each packet by the hardware.

For the case of direct put packets, the direct put packet header 540 includes bits specifying: a Rec. Payload Base Address ID, Put Offset and a reception Counter ID (e.g., set by software), a number of Valid Bytes in Packet Payload (specifying how many bytes in the payload are actually valid—for example, when the packet has 2 chunks (=32B*2=64B) payload but the number of valid bytes is 35, the first 35 bytes out of 64 bytes payload data is valid; thus, MU reception logic will store only first 35 bytes to the memory system.); and Counter Offset value (e.g., set by software), each such as processed by MU 100B-2 as described herein in connection with FIG. 6B.

Figure 6C:
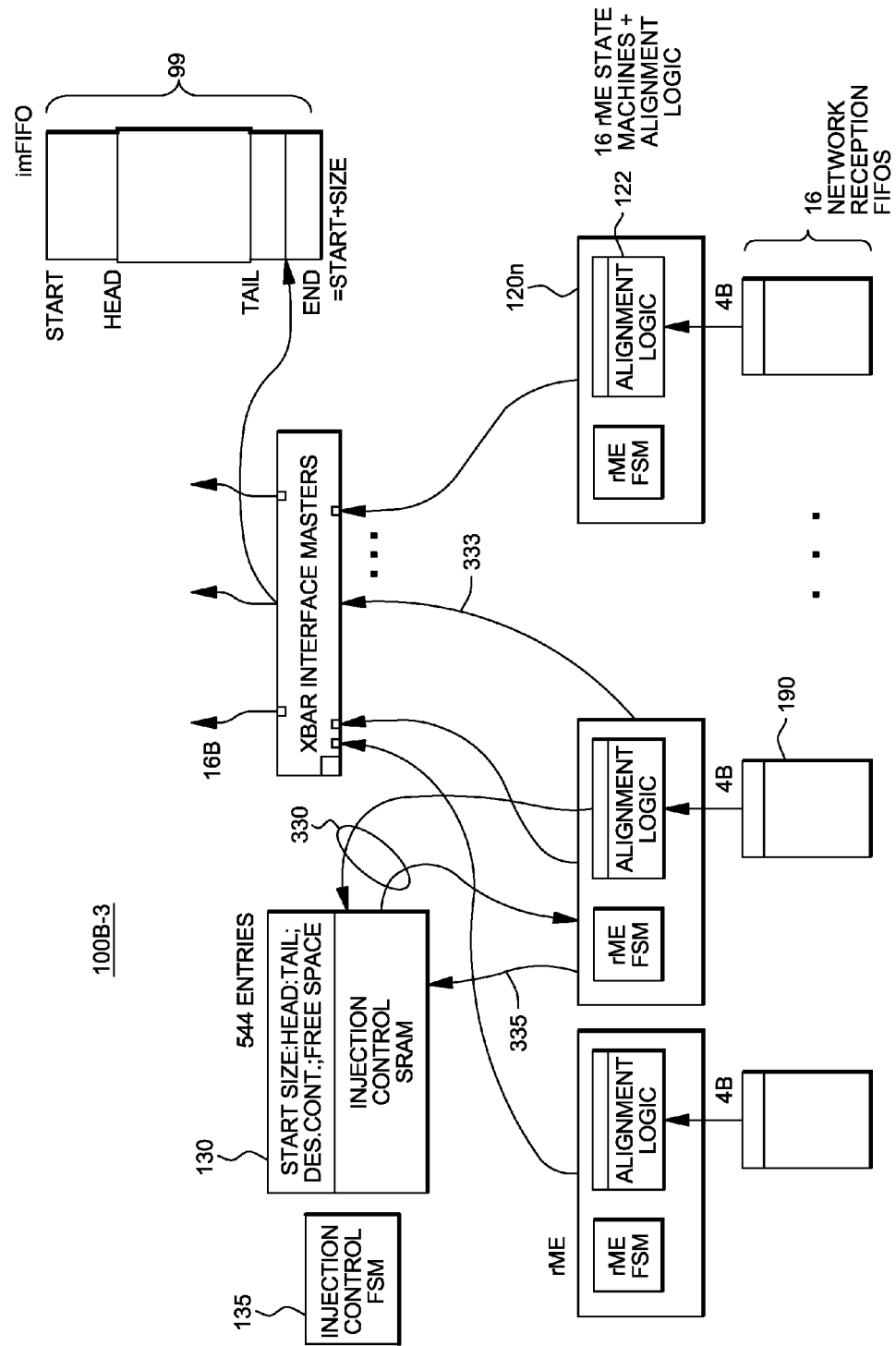
FIG. 6C depicts operation of the MU device 100B-3 for processing received remote get packets according to one embodiment.

For the case of remote get packets, the remote get packet header 550 includes the Remote Get Injection FIFO ID such as processed by the MU 100B-3 as described herein in connection with FIG. 6C.

Interrupt Control

Interrupts and, in one embodiment, interrupt masking for the MU 100 provide additional functional flexibility. In one embodiment, interrupts may be grouped to target a particular processor on the chip, so that each processor can handle its own interrupt. Alternately, all interrupts can be configured to be directed to a single processor which acts as a "monitor" of the processors on the chip. The exact configuration can be programmed by software at the node in the way that it writes values into the configuration registers.

Figure 15:
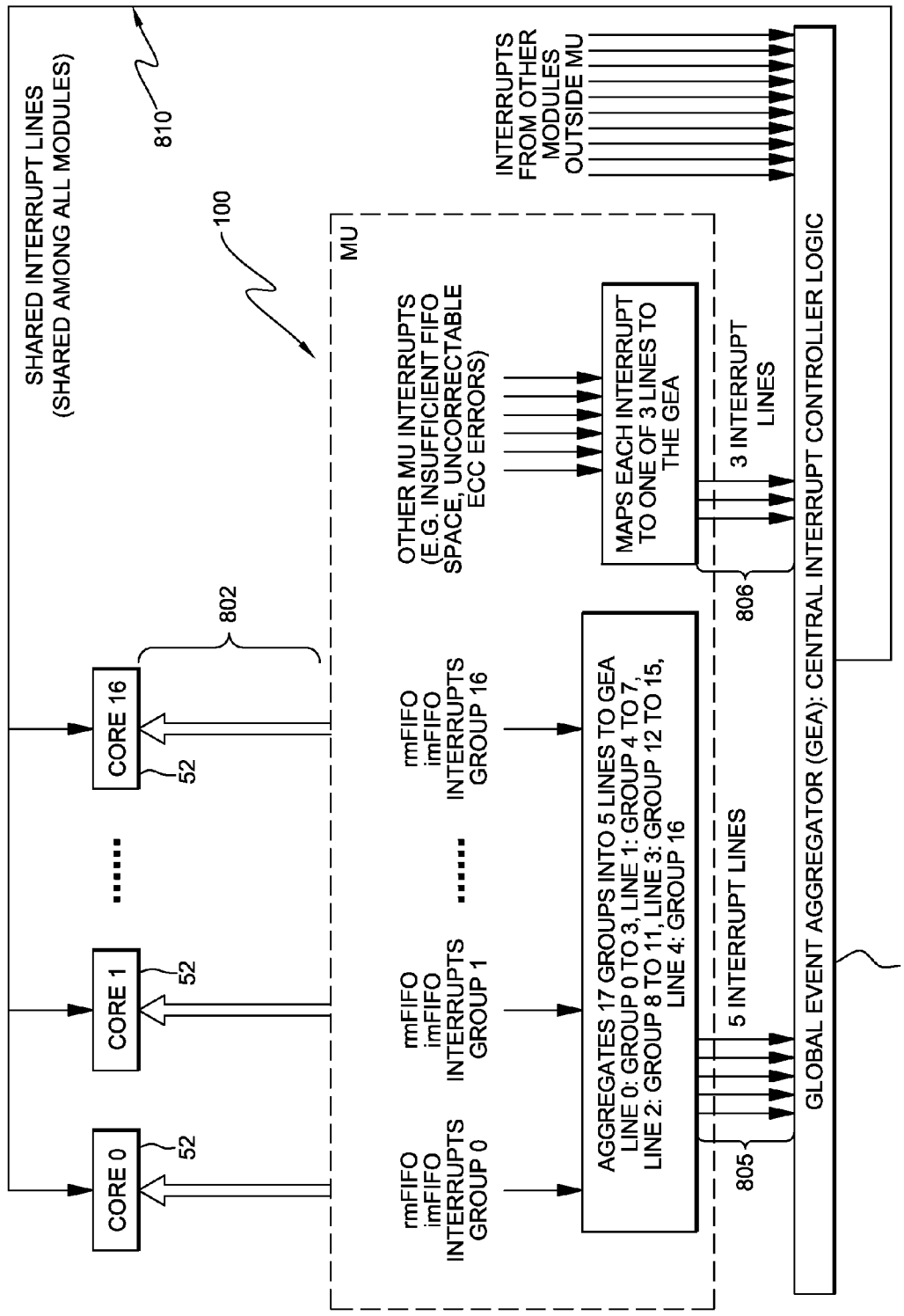

In one example, there are multiple interrupt signals 802 that can be generated from the MU for receipt at the 17 processor cores shown in the compute node embodiment depicted in FIG. 15. In one embodiment, there are four interrupts being directed to each processor core, with one interrupt corresponding to each thread, making for a total of 68 interrupts directed from the MU 100 to the cores. A few aggregated interrupts are targeted to an interrupt controller (Global Event Aggregator or GEA) 900. The signal interrupts are raised based on three conditions including, but not limited to: an interrupt signaling a packet arrival to a reception memory FIFO, a reception memory FIFO fullness crossing a threshold, or an injection memory FIFO free space crossing a threshold, e.g., injection memory FIFO threshold. In any of these cases, software at the processor core handles the situation appropriately.

For example, MU generated interrupts include: packet arrival interrupts that are raised by MU reception logic when a packet has been received. Using this interrupt, the software being run at the node can know when a message has been received. This interrupt is raised when the interrupt bit in the packet header is set to 1. The application software on the sender node can set this bit as follows: if the interrupt bit in the header in a message descriptor is 1, the MU will set the interrupt bit of the last packet of the message. As a result, this interrupt will be raised when the last packet of the message has been received.

MU generated interrupts further include: imFIFO threshold crossed interrupt that is raised when the free space of an imFIFO exceeds a threshold. The threshold can be specified by a control register in DCR. Using this interrupt, application software can know that an MU has processed descriptors in an imFIFO and there is space to inject new descriptors. This interrupt is not used for an imFIFO that is configured to receive remote get packets.

MU generated interrupts further include: remote get imFIFO threshold crossed interrupt. This interrupt may be raised when the free space of an imFIFO falls below the threshold (specified in DCR). Using this interrupt, the software can notice that MU is running out of free space in the FIFO. Software at the node might take some action to avoid FIFO full (e.g. increasing FIFO size). This interrupt is used only for an imFIFO that is configured to receive remote get packets.

MU generated interrupts further include an rmFIFO threshold crossed interrupt which is similar to the remote get FIFO threshold crossed interrupt; this interrupt to be raised when the free space of an rmFIFO fall below the threshold.

MU generated interrupts further include a remote get imFIFO insufficient space interrupt that is raised when the MU receives a remote get packet but there is no more room in the target imFIFO to store this packet. Software responds by taking some action to clear the FIFO.

MU generated interrupts further include an rmFIFO insufficient space interrupt which may be raised when the MU receives a memory FIFO packet but there is no room in the target rmFIFO to store this packet. Software running at the node may respond by taking some action to make free space. MU generated interrupts further include error interrupts that reports various errors and are not raised under normal operations.

In one example embodiment shown in FIG. 15, the interrupts may be coalesced, as follows: within the MU, there is provided, for example, 17 MU groups with each group divided into 4 subgroups. A subgroup consists of 4 reception memory FIFOs (16 FIFOs per group divided by 4) and 8 injection memory FIFOs (32 FIFOs per group divided by 4). Each of the 68 subgroups can generate one interrupt, i.e., the interrupt is raised if any of the three conditions above occurs for any FIFO in the subgroup. The group of four interrupt lines for the same processor core has paired an interrupt status register (not shown) located in the MU's memory mapped I/O space, thus, providing a total of 17 interrupt status registers, in the embodiment described herein. Each interrupt status register has 64 bits with the following assignments: 16 bits for packet arrived including one bit per reception memory FIFO coupled to that processor core; 16 bits for reception memory FIFO fullness crossed threshold with one bit per reception memory FIFO coupled to that processor core; and, 32 bits for injection memory FIFO free space crossed threshold with one bit per injection memory FIFO coupled to that processor core. For the 16 bits for packet arrival, these bits are set if a packet with interrupt enable bit set is received in the paired reception memory FIFO; for the 16 bits for reception memory FIFO fullness crossed threshold, these bits are used to signal if free space in a FIFO is less than some threshold, which is specified in a DCR register. There is one threshold register for all reception memory FIFOs. This check is performed before a packet is actually stored to FIFO. If the current available space minus the size of the new packet is less than the threshold, this interrupt will be issued. Therefore, if the software reads FIFO pointers just after an interrupt, the observed available FIFO space may not necessarily be less than the threshold. For the 32 bits for injection memory FIFO free space crossed threshold, the bits are used to signal if the free space in the FIFO is larger than the threshold which is specified in the injection threshold register mapped in the DCR address space. There is one threshold register for all injection memory FIFOs. If a paired imFIFO is configured to receive remote get packets, then these bits are used to indicate if the free space in the FIFO is smaller than the "remote get" threshold which is specified in a remote get threshold register mapped in the DCR address space (note that this is a separate threshold register, and this threshold value can be different from both thresholds used for the injection memory FIFOs not configured to receive remote get packets and reception memory FIFOs.)

In addition to these 68 direct interrupts 802, there may be provided 5 more interrupt lines 805 with the interrupt: groups 0 to 3 are connected to the first interrupt line, groups 4 to 7 to the second line, groups 8 to 11 to the third interrupt, groups 12 to 15 to the fourth interrupt, and the group 16 is connected to the fifth interrupt line. These five interrupts 805 are sent to a global event aggregator (GEA) 900 where they can then be forwarded to any thread on any core.

The MU additionally, may include three DCR mask registers to control which of these 68 direct interrupts participate in raising the five interrupt lines connected to the GEA unit. The three (3) DCR registers, in one embodiment, may have 68 mask bits, and are organized as follows: 32 bits in the first mask register for cores 0 to 7, 32 bits in the second mask register for cores 8 to 15, and 4 mask bits for the 17th core in the third mask register.

In addition to these interrupts, there are additional more interrupt lines 806 for fatal and nonfatal interrupts signaling more serious errors such as a reception memory FIFO becoming full, fatal errors (e.g., an ECC uncorrectable error), correctable error counts exceeding a threshold, or protection errors. All interrupts are level-based and are not pulsed.

Additionally, software can "mask" interrupts, i.e., program mask registers to raise an interrupt only for particular events, and to ignore other events. Thus, each interrupt can be masked in MU, i.e., software can control whether MU propagates a given interrupt to the processor core, or not. The MU can remember that an interrupt happened even when it is masked. Therefore, if the interrupt is unmasked afterward, the processor core will receive the interrupt.

As for packet arrival and threshold crossed interrupts, they can be masked on a per-FIFO basis. For example, software can mask a threshold crossed interrupt for imFIFO 0,1,2, but enable this interrupt for imFIFO 3, et seq.

In one embodiment, direct interrupts 802 and shared interrupt lines 810 are available for propagating interrupts from MU to the processor core. Using direct interrupts 802, each processor core can directly receive packet arrival and threshold crossed interrupts generated at a subset of imFIFOs/rmFIFOs. For this purpose, there are logic paths directly connect between MU and cores.

For example, a processor core 0 can receive interrupts that happened on imFIFO 0-31 and rmFIFO 0-15. Similarly, core 1 can receive interrupts that happened on imFIFO 32-63 and imFIFO 16-31. In this example scheme, a processor core N (N=0, . . . , 16) can receive interrupts that happened on imFIFO **32*N to 32*N+31 and rmFIFO 16*N to 16*N+15**. Using this mechanism each core can monitor its own subset of imFIFOs/rmFIFOs which is useful when software manages imFIFOs/rmFIFOs using 17 cores in parallel. Since no central interrupt control mechanism is involved, direct interrupts are faster than GEA aggregated interrupts as these interrupt lines are dedicated for MU.

Software can identify the source of the interrupt quickly, speeding up interrupt handling. A processor core can ignore interrupts reported via this direct path, i.e., a direct interrupt can be masked using a control register.

As shown in FIG. 15, there is a central interrupt controller logic GEA 900 outside of the MU device. In general GEA interrupts 810 are delivered to the cores via this controller. Besides the above direct interrupt path, all the MU interrupts share connection to this interrupt controller. This controller delivers MU interrupts to the cores. Software is able to program how to deliver a given interrupt.

Using this controller, a processor core can receive arbitrary interrupts issued by the MU. For example, a core can listen to threshold crossed interrupts on all the imFIFOs and rmFIFOs. It is understood that a core can ignore interrupts coming from this interrupt controller.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the computer program product performs the one or more of functions of this invention. The present invention may also include a computer program product for one or more functions of this invention. The computer program product includes a storage medium (e.g., a disk, optical disc, memory device, solid-state drive, etc.) readable by a processing circuit and storing instructions run by the processing circuit for performing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new, and desire to secure by Letters Patent is:

1. A method for receiving messages in a parallel computing system having a plurality of nodes, each node having multiple processor units and an associated memory system operatively connected therewith via an interconnect device, said method comprising:

receiving, at a network receiver device of a plurality of network receiver devices, a packet associated with a message and storing said packet at a network reception queue;

receiving, at a reception control unit, information from a processor at a node for handling of packets associated with messages received over a network, said received information specifying pointers to addresses in said associated memory system where data received from a message packet is to be stored;

receiving, at one of a plurality of parallel distributed reception messaging engine units (rMEs) associated with said network reception buffer, a packet header of said received packet, each reception messaging engine unit providing a multi-channel direct memory access (DMA) function and corresponds to a network reception queue operatively connected with the reception control unit;

receiving, at said reception messaging engine unit, a pointer address from the reception control unit;

aligning received data on a byte alignment value specified in said packet, wherein said packet data is written to the location in memory system using signals to identify valid bytes, transferring the received packet from the network reception buffer directly to a location in the associated memory system specified by the pointer, wherein each associated reception message engine unit is coupled with an interconnect device having ports adapted for providing a connection to said interconnect device, said method further comprising:

arbitrating requests between each said rMEs to assign access to an interconnect port; and, writing packet data from said network reception buffer to said location in memory system via said interconnect device, and, wherein a received packet type specifies storage at said location in a memory system associated with said processor device, said method further comprising:

calculating, at said rME unit, a destination address in said memory system and moving only payload data of the received packet from a network reception queue at said destination address in the memory system;

calculating, at said rME unit, a counter address for storing a byte count value, obtaining, at said rME, a data ID field and a counter ID field from said packet header values and, respective data offset value and counter offset value; and receiving, from a reception control memory, based upon said data ID field and a counter ID field, a respective base address in said memory system, and a counter base address in said memory system, said calculating of a destination address and counter address comprising:

adding said specified data offset to said to said base address; and, adding said specified counter offset value to said counter base address, wherein at least two messages may be received and processed simultaneously without intervention of a processor unit.

2. The method as claimed in claim 1, wherein said pointer address points to a tail of a buffer in memory system, said writing of packet data comprising writing, via the interconnect device, the received packet header and the payload into the location in memory system starting at the tail pointer in predetermined byte lengths; and upon completing the transfer of the packet to the memory system, said method further comprising:

updating, by the rME, the tail pointer by increasing the tail pointer address according to number of bytes transferred in the packet; and, writing the new tail pointer to the reception control memory.

3. The method as claimed in claim 1, wherein a received packet type specifies storage at one of a plurality of injection memory buffers located in said memory system, said method further comprising:

accessing said injection control unit for obtaining an address for pointing to said injection memory buffer; and, transferring said payload data of the received packet from a network reception queue to said injection memory buffer.

4. The method as claimed in claim 3, wherein said obtaining an address for pointing to said injection memory buffer comprises:

reading, from an injection control memory, a tail pointer address to the corresponding injection memory buffer location; and, writing the packet to the location after the tail pointer address pointed to by the corresponding tail pointer read from the injection control memory, said payload data being written in one or more predetermined byte size denominations.

5. The method as claimed in claim 4, wherein said packet includes a message descriptor describing a new message to be injected in said network, said method further comprising:

updating, said tail pointer in the injection control memory to point to the new tail pointing to said message descriptor.

6. A messaging system for a parallel computing device having a plurality of nodes, each node having multiple processor units and associated memory system operatively connected therewith via an interconnect device, said messaging system comprising at each node:

a plurality of network transmit devices for transmitting message packets over a network;

injection control unit for receiving and processing requests from processor units at a node for transmitting messages over a network via one or more network transmit devices;

a plurality of parallel distributed injection messaging engine units (iMEs) each providing a multi-channel direct memory access (DMA) function, each injection messaging engine unit operatively connected with said injection control unit and configured to read data in said associated memory system via said interconnect device, and forming a packet belonging to said message, said packet including a packet header and said read data, an interconnect interface device having one or more ports for coupling each injection message engine unit of said distributed plurality with said interconnect device, each port adapted for forwarding data content read from specified locations in associated memory system to at least one requesting injection messaging engine unit in parallel, said associated memory system includes a plurality of injection memory buffers, each injection memory buffer adapted to receive, from a processor, a descriptor associated with a message to be transmitted over a network, said descriptor including a specified target address having said data to be included in said message, one of said injection messaging engine units accessing said descriptor data for reading said data to be included in said message from said memory system, wherein, at said node, two or more packets associated with two or more different messages may be simultaneously formed by a respective two or more injection messaging engine units, in parallel, for simultaneous transmission over said network; and, a plurality of receiver devices for receiving message packets from a network, a network reception queue associated with a receiver device, each network reception queue adapted to buffer said received packet, a reception control unit for receiving information from a processor at a node for handling of packets received over a network; and, a plurality of parallel distributed reception messaging engine units (rMEs) each providing a multi-channel direct memory access (DMA) function, a reception messaging engine unit operatively connected with the reception control unit, said reception messaging engine unit initiates transfer of the received packet directly to a location in the associated memory system, wherein each associated reception message engine unit is coupled with an interconnect device having ports adapted for providing a connection to said interconnect device, said method further comprising:

aligning received data on a byte alignment value specified in said packet, wherein said packet data is written to the location in memory system using signals to identify valid bytes, arbitrating requests between each said rMEs to assign access to an interconnect port; and, writing packet data from said network reception buffer to said location in memory system via said interconnect device, and,
wherein a received packet type specifies storage at said location in a memory system associated with said processor device, said method further comprising:
calculating, at said rME unit, a destination address in said memory system and moving only payload data of the received packet from a network reception queue at said destination address in the memory system;
calculating, at said rME unit, a counter address for storing a byte count value,
obtaining, at said rME, a data ID field and a counter ID field from said packet header values and, respective data offset value and counter offset value; and
receiving, from a reception control memory, based upon said data ID field and a counter ID field, a respective base address in said memory system, and a counter base address in said memory system, said calculating of a destination address and counter address comprising:
adding said specified data offset to said to said base address; and,
adding said specified counter offset value to said counter base address,
wherein, two or more packets may be simultaneously processed by a respective two or more reception messaging engine units, in parallel, for simultaneous reception over said network without intervention of a processor unit.

7. The system as claimed in claim 6, wherein said injection control unit comprises:
injection control state machine for determining presence of processor requests for new messages to be injected into said network; and,
injection control memory device responsive to said injection control state machine for receiving and storing data from said descriptor associated with each message to be sent as packets over said network, said descriptor data including a pointer to a message payload in memory system, wherein an injection messaging engine unit accesses said descriptor data for reading said payload data from said memory system.

8. The system as claimed in claim 7, wherein said injection control unit further comprises:
a message control memory device for storing descriptor data, said descriptor data including a message start address, a message size data associated with a message to be sent over said network, and said packet header for use in forming one or more packets at a network injection queue associated with a network transmit device.

9. The system as claimed in claim 6, wherein said injection control unit further comprises:
a message selection arbitration unit for receiving information from the message control memory device and availability information from each said plurality of injection messaging engine units; determining if there is a message pending; and, assigning said message to an available injection messaging engine unit to initiate injection of a packet belonging to that message.

10. The system as claimed in claim 9, wherein when more than one message is available for injection, said message selection arbitration unit further enables randomly selecting a message that can be sent via an available injection messaging engine unit, wherein one message is selected and assigned.

11. The system as claimed in claim 8, said iME unit tracking status of each message, wherein after processing a packet for injection, said iME unit updating a remaining number of bytes associated with a message to be sent, and updating a starting address for a next packet to be injected for said message.

12. The system as claimed in claim 6, further including a network interface device including a plurality of network injection queues corresponding to said plurality of iMEs, said network transmit device providing a signal to indicate to a corresponding said injection messaging engine unit whether or not there is space in its corresponding network injection queue for writing packet data to said network injection queue.

13. The system as claimed in claim 6, wherein said interconnect interface device further comprises at least one port for coupling each reception message engine unit of said plurality with said interconnect device, each port adapted for providing a connection to said interconnect device to write packet data to the associated memory system, said interconnect interface device arbitrating between said plurality of rMEs to assign access to a port,
wherein at least two messages may be received and processed simultaneously, in parallel.

14. The system as claimed in claim 13, wherein said reception messaging engine unit comprises byte alignment device for aligning received data on any byte alignment specified in said packet, wherein said packet data is written to the memory system using signals to identify valid bytes.

15. The system as claimed in claim 13, wherein said reception control unit comprises:
a reception control memory device for storing pointers associated with locations in said associated memory system; and,
a reception control state machine for arbitrating accesses to reception control memory device between multiple reception messaging engine units and processor requests, and updating memory address pointers.

16. The system as claimed in claim 13, wherein a reception messaging engine unit is configured to obtain a packet header from a received packet, and identify from the packet header, a type of packet received, wherein, a received packet type specifies storage at a location in a memory system associated with said processor device, said reception messaging engine unit further calculating a destination address in a memory system and moving only payload data of the received packet from a network reception queue at said destination address in the memory system.

17. The system as claimed in claim 13, wherein a received packet type specifies storage at one of a plurality of injection memory queues at a node, said reception messaging engine unit further accessing said injection control unit for obtaining an address for pointing to said injection memory buffer, and transferring of said payload data of the received packet from a network reception queue to an injection memory buffer.

* * * * *